(12) United States Patent
Moore et al.

(10) Patent No.: US 10,218,282 B1
(45) Date of Patent: Feb. 26, 2019

(54) METHOD AND APPARATUS FOR SEQUENCING OUTPUTS IN A MULTI-OUTPUT POWER CONVERTER SYSTEM

(71) Applicant: Power Integrations, Inc., San Jose, CA (US)

(72) Inventors: Karl Moore, Ely (GB); Matthew David Waterson, Bottisham (GB); Antonius Jacobus Johannes Werner, Cambridge (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/994,888

(22) Filed: May 31, 2018

(51) Int. Cl.
| | | |
|---|---|---|
| *H02M 7/155* | (2006.01) | |
| *H02M 3/335* | (2006.01) | |
| *H02M 1/08* | (2006.01) | |
| *H05B 33/08* | (2006.01) | |
| *H02M 1/00* | (2006.01) | |

(52) U.S. Cl.
CPC ......... *H02M 3/33561* (2013.01); *H02M 1/08* (2013.01); *H05B 33/0815* (2013.01); *H05B 33/0827* (2013.01); *H02M 2001/0083* (2013.01)

(58) Field of Classification Search
CPC ...... H02M 3/33523; H02M 1/08; H02M 1/42; H02M 2001/0009; H02M 1/4258
USPC .... 363/13, 15–20, 49–53, 55–56.02, 97, 98, 363/125–127, 131–132
See application file for complete search history.

(56) References Cited

U.S. PATENT DOCUMENTS

| | | | | | |
|---|---|---|---|---|---|
| 4,151,387 | A | * | 4/1979 | Peters, Jr. ................. | F24C 7/02 219/623 |
| 4,475,150 | A | * | 10/1984 | D'Atre ................ | H02M 5/4505 318/806 |
| 4,641,229 | A | * | 2/1987 | Easter ............... | H02M 3/33523 363/21.18 |
| 5,714,953 | A | * | 2/1998 | Mitani .................. | H03M 1/687 341/144 |
| 6,388,896 | B1 | * | 5/2002 | Cuk ..................... | H02M 3/1582 363/16 |
| 8,228,690 | B2 | * | 7/2012 | Watanabe ................. | H02J 1/10 307/43 |

(Continued)

OTHER PUBLICATIONS

Jurgilewicz, Bob, "Power Supply Sequencing Made Simple—Design Note 401", Linear Technology Design Notes 10/06/401, Linear Technology Corporation 2006, USA.

(Continued)

*Primary Examiner* — Adolf Berhane
*Assistant Examiner* — Nusrat Quddus
(74) *Attorney, Agent, or Firm* — Brian Floyd; Power Integrations, Inc.

(57) ABSTRACT

Apparatus and methods for sequencing outputs in a multi-output power converter system are disclosed herein. During start-up multiple CC/CV outputs may be sequenced so that energy is first provided to a highest voltage secondary output and subsequently provided to a lowest voltage secondary output. Additionally, control may be exerted so as to concurrently and monotonically increase voltages during at least part of the start-up transient; and concurrent control may be further implemented using control circuitry and a variable reference generator. In some embodiments a variable reference may be generated from a capacitor voltage.

40 Claims, 19 Drawing Sheets

(56) References Cited

U.S. PATENT DOCUMENTS

| | | | | |
|---|---|---|---|---|
| 9,087,656 | B1* | 7/2015 | Vinciarelli | H01H 9/54 |
| 9,276,602 | B1* | 3/2016 | Pagnanelli | H03M 3/358 |
| 9,362,829 | B2* | 6/2016 | Liu | H02M 3/1584 |
| 9,680,497 | B2* | 6/2017 | Pagnanelli | H03M 3/40 |
| 9,750,102 | B1* | 8/2017 | Mao | H05B 33/0851 |
| 9,800,131 | B1* | 10/2017 | Chen | H02M 1/084 |
| 2001/0024373 | A1* | 9/2001 | Cuk | H02M 1/44 |
| | | | | 363/16 |
| 2012/0250382 | A1* | 10/2012 | Frattini | H02M 3/33569 |
| | | | | 363/126 |
| 2016/0040394 | A1* | 2/2016 | Monden | B60W 20/20 |
| | | | | 414/685 |
| 2016/0204689 | A1* | 7/2016 | Wennerstrom | H02P 6/14 |
| | | | | 318/400.26 |
| 2017/0237339 | A1* | 8/2017 | Young | H02M 1/38 |
| | | | | 363/126 |
| 2017/0358989 | A1* | 12/2017 | Werner | H02M 1/08 |
| 2018/0026528 | A1* | 1/2018 | Xiong | H02M 3/07 |
| | | | | 323/312 |
| 2018/0159434 | A1* | 6/2018 | Werner et al. | H02M 3/33561 |
| 2018/0248466 | A1* | 8/2018 | Pham | H02M 1/08 |

OTHER PUBLICATIONS

Singh, Sanjay Pratap, "Simple power-rail sequencing solutions for complex multi-rail systems", Texas Instruments, SLYY101, Jul. 2016, pp. 1-8.

* cited by examiner

METHOD AND APPARATUS FOR SEQUENCING OUTPUTS IN A MULTI-OUTPUT POWER CONVERTER SYSTEM

FIELD OF THE DISCLOSURE

The present invention relates to sequencing outputs in a multi-output power converter system and more particularly to sequencing outputs in a multi-output switch-mode converter.

BACKGROUND INFORMATION

Many electronic devices, such as cell phones, laptops, etc., are powered by direct current (dc) power derived from a power supply. Conventional wall outlets generally deliver a high voltage alternating current (ac) power that needs to be converted to regulated dc power in order to be used as a power source for consumer electronic devices. Switch mode power converters, also referred to as switch mode power supplies (SMPSs), are commonly used due to their high efficiency, small size, and low weight to convert a high voltage ac power to a regulated dc power.

Many electronic devices have multiple loads and require more than one dc power source in order to operate. For instance, an audio electronic device may have system components which operate at five volts and audio components which operate at twelve volts. In these applications a multi-output power converter converts ac power to multiple dc power outputs to provide regulated dc power to each of the multiple loads, namely the system components and the audio components. In some applications the regulated dc power outputs are regulated constant current (CC) outputs and/or regulated constant voltage (CV) outputs.

BRIEF DESCRIPTION OF THE DRAWINGS

Non-limiting and non-exhaustive embodiments of sequencing outputs in multi-output power converter systems are described with reference to the following figures, wherein like reference numerals refer to like parts throughout the various views unless otherwise specified.

Figure 1:
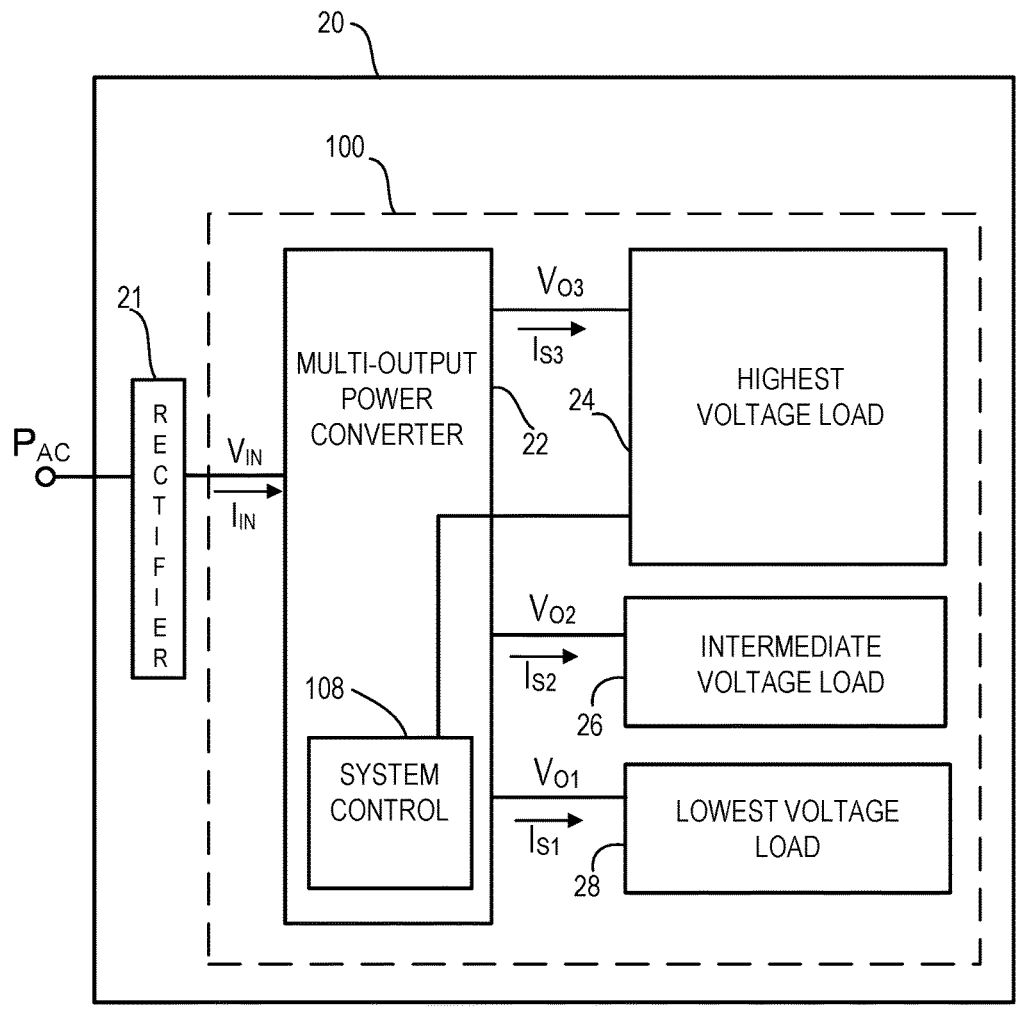
FIG. 1 illustrates an application product using a multi-output power converter system according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments of sequencing outputs in multi-output power converter systems.

DETAILED DESCRIPTION

In the following description, numerous specific details are set forth in order to provide a thorough understanding of sequencing outputs in multi-output power converter systems. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of sequencing outputs in multi-output switch-mode converter systems. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or Integrated circuit (IC) are defined or measured.

As mentioned above, a multi-output power converter may be used to provide regulated dc power to multiple loads. The multi-output power converter including the multiple loads may be referred to as a multi-output power converter system. The loads can be passive and/or active loads including discrete semiconductor devices, microprocessors, controllers, mixed signal circuit components, and the like. In providing regulated dc power, the multi-output power converter system may regulate output current to a constant current (CC) output and/or regulate output voltage to a constant voltage (CV) output. Additionally, system voltages may be defined relative to how the multi-output power converter system provides power. For instance, a multi-output power converter system may provide a CC output operating at approximately forty volts, a CV output regulated to twelve volts, a CC output operating at approximately seven volts, and a CV output regulated to three volts. Relatively, the CC output operating at approximately forty volts may be referred to as having a "highest" voltage; and the three volt CV output may be referred to as having a "lowest" voltage. Additionally, the twelve volt CV output and the CC output operating at approximately seven volts may each be referred to as having an "intermediate" voltage.

FIG. 1 illustrates an application product 20 using a multi-output power converter system 100 according to an embodiment. The multi-output power converter system 100 includes a multi-output power converter 22, a highest voltage load 24, an intermediate voltage load 26, and a lowest voltage load 28. By way of example application product 20 can be a television; and the highest voltage load 24, the intermediate voltage load 26, and the lowest voltage load 28 may include a display operating at forty volts, a speaker operating at twelve volts, and microprocessor operating at five volts, respectively. As shown the application product 20 may also receive alternating current (ac) "mains" input power $P_{AC}$ and may use an optional rectifier 21 to convert the ac power into a rectified ac line input voltage $V_{IN}$ and line current $I_{IN}$. The multi-output power converter 22 can receive the rectified ac line input voltage $V_{IN}$ (and line current $I_{IN}$) and deliver multiple output voltages $V_{O1}$-$V_{O3}$ and load currents $I_{S1}$-$I_{S3}$ to the highest voltage load 24, the intermediate voltage load 26, and the lowest voltage load 28. Additionally, in the steady state the multi-output power converter 22 can regulate one or more of the multiple output voltages $V_{O1}$-$V_{O3}$ and/or load currents $I_{S1}$-$I_{S3}$.

In the teachings herein, when the multi-output power converter system 100 regulates an output voltage (e.g., one or more of the multiple output voltages $V_{O1}$-$V_{O3}$) to be constant in the steady state, the output may be referred to as a constant voltage (CV) output. Also, when the multi-output power converter system 100 regulates a load current (e.g., one or more of the load currents $I_{S1}$-$I_{S3}$) to be constant in the steady state, the output may be referred to as a constant current (CC) output. Additionally, although the multi-output power converter system 100 has three multiple outputs, configurations having greater or fewer multiple outputs are possible. For instance, in some configurations, the multi-output converter system 100 may have two outputs providing two output voltages and two load currents.

Also, as described herein a multi-output power converter system 100 may initially operate under transient conditions with unknown variable load conditions. When input power $P_{AC}$ is initially applied and the multi-output switch mode converter 22 becomes enabled, the multiple outputs $V_{O1}$-$V_{O3}$ may be in an undetermined state and/or substantially zero state. The transient period from when the multiple outputs $V_{O1}$-$V_{O3}$ outputs are initially null to when they reach their regulated (steady-state) values can be referred to as a "start-up transient", "start-up period", or "start-up".

The multi-output power converter system 100 can be realized with a switch-mode power converter including an energy transfer element, such as a transformer, tailored for multiple outputs. For instance, a switch-mode power converter can be implemented in a forward converter topology and/or in a flyback converter topology with a transformer having a multi-output secondary. In the steady state after the start-up period is complete, power may be transferred from the primary to the secondary, and the multiple secondary outputs may be independently regulated by a controller and/or system control module 108. In some configurations the controller and/or system control module 108 may receive power from a CV output of the multi-output secondary; and the controller may use feedback loops configured to regulate CC and/or CV (CC/CV) outputs in the steady state.

Also, in many applications where multiple output loads may include peripherals, microprocessors, and voltage sensitive integrated circuits, it can be important for a multi-output switch mode converter to not only control and independently regulate the steady state values of the CC/CV outputs, but also to control the manner in which power is delivered during start-up. For instance, stable system operation of a microprocessor and its associated circuitry may necessitate a supply source which does not decrease or trigger processor-related under-voltage (voltage droop) lockout errors. Therefore, it can be desirable to sequence the CC/CV outputs to monotonically increase without voltage droop during start-up.

However, during start-up the sequencing of multiple outputs of a secondary in a multi-output switch mode power converter system can be problematic. For instance, controllers and internal circuitry may operate from one or more of the CC/CV outputs, and therefore, may not have regulated power during at least part of the start-up transient. Additionally, the multiple outputs of a secondary may have a common transformer core where the transfer of energy from a primary is determined by the switching behavior of a single primary switch. Thus, during start-up, independent control of multiple outputs may not be available for at least part of the start-up transient. Further, the power demand from the multiple loads may be variable causing unwanted, deleterious fluctuations in the voltages at the CC/CV outputs.

Accordingly, there is a need for a control approach and corresponding circuit apparatus to sequence power delivered to the multiple outputs of a multi-output switch mode converter system and to mitigate problems associated with voltage droop during start-up.

Apparatus and methods for sequencing outputs in a multi-output power converter system are disclosed herein. During start-up multiple CC/CV outputs may be sequenced so that energy is first provided to a highest voltage secondary output and subsequently provided to a low voltage secondary output. Additionally, control may be exerted so as to concurrently and monotonically increase voltages during at least part of the start-up transient; and concurrent control may be further implemented using control circuitry and a variable reference generator. In some embodiments a variable reference may be generated from a capacitor voltage.

Figure 2A:
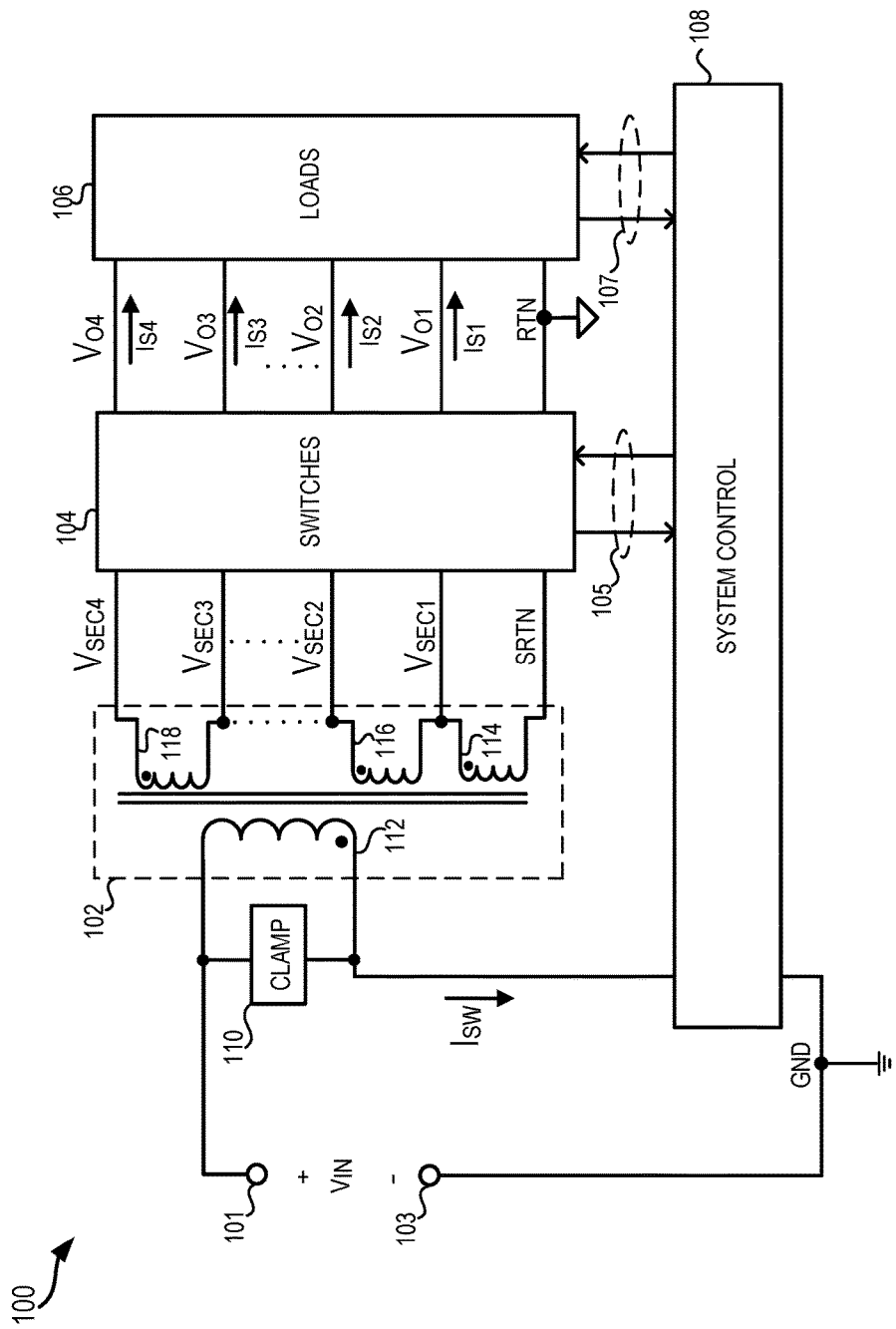
FIG. 2A illustrates a system level diagram of a multi-output power converter system including multiple loads according to the teachings herein.
Figure 2B:
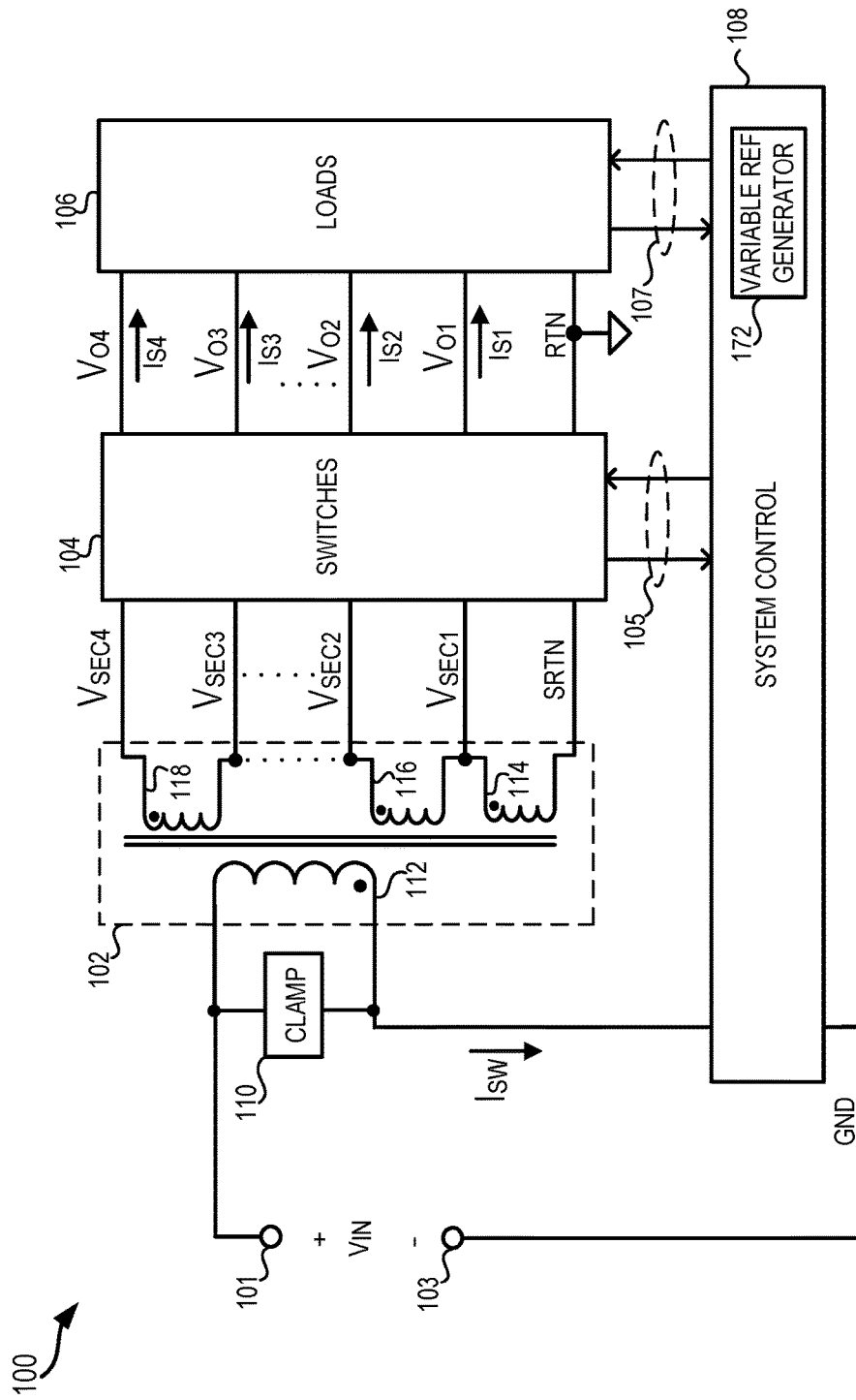
FIG. 2B illustrates the system level diagram of the multi-output power converter system of FIG. 2B including a variable reference generator according to the teachings herein.

FIG. 2A illustrates a system level diagram of a multi-output power converter system 100 including multiple loads 106 according to the teachings herein; and FIG. 2B illustrates the system level diagram including a variable reference generator 172 according to the teachings herein. The multi-output power converter system 100 also includes a transformer 102, secondary switches block 104, a system control module 108, and a clamp 110 which can be arranged in a flyback configuration. The transformer 102 includes a primary winding 112 and multiple secondary windings 114, 116, 118 to provide galvanic isolation and may be referred to as an energy transfer element. The transformer 102 may be used to transfer rectified ac power from the primary winding 112 to the multiple secondary windings 114, 116, 118, and in some embodiments the transformer 102 may also be referred to as a "coupled inductor". Also as shown in FIG. 2A and FIG. 2B, the secondary windings 114, 116, 118 may be electrically coupled with the secondary switches block 104 to provide secondary winding voltages $V_{SEC1}$-$V_{SEC4}$ relative to a secondary return potential SRTN.

Regulated power conversion commences when a rectified ac line voltage $V_{IN}$ is applied at terminals 101, 103 and the multi-output power converter system 100 reaches steady state. In the steady state the multi-output power converter system 100 can use the system control module 108 to convert input power associated with the rectified ac line voltage $V_{IN}$. The input power may be converted into multiple output voltages $V_{O1}$-$V_{O4}$, relative to a secondary ground RTN, delivering corresponding load currents $I_{S1}$-$I_{S4}$. In order to effect closed loop regulation in the steady state, the system control module 108 may be electrically coupled with the secondary switches block 104 to transmit and receive secondary switch signals 105 and also coupled with the multiple loads 106 to transmit and receive load feedback signals 107.

In the context of the present disclosure applying a rectified ac line voltage $V_{IN}$ may also be referred to as applying power and/or "mains" power at the "primary" of the multi-output power converter system 100. Also, in the multi-output power converter system 100, multiple output voltages (e.g., $V_{O1}$-$V_{O4}$) may be delivered to "multiple outputs." For instance, a circuit node associated with output voltage $V_{O1}$ may be referred to as an "output" of the multi-output power converter system 100.

In the steady state the system control module 108 may control primary switch current $I_{SW}$ in the primary winding 112 to system ground GND and also regulate one or more of the multiple output voltages $V_{O1}$-$V_{O4}$ and/or load currents $I_{S1}$-$I_{S4}$ by providing secondary switch signals 105. As discussed above, regulation of output voltage (i.e., $V_{O1}$-$V_{O4}$) corresponds to providing a CV output while regulation of an output (load) current (i.e., $I_{S1}$-$I_{S4}$) corresponds to providing a CC output.

Although the multi-output power converter system 100 illustrates a flyback configuration for providing four multiple outputs $V_{O1}$-$V_{O4}$ with corresponding load currents $I_{S1}$-$I_{S4}$, other configurations with greater or fewer multiple outputs are possible. For instance, the teachings herein may also be applicable to forward converters and/or other converter topologies using transformers having multiple secondary windings. Also, as one of ordinary skill in the art can appreciate, transformers with multiple secondary outputs may be arranged in any coupling combination of series (i.e., stacked) windings, parallel windings, or both series windings and parallel windings with a common return line for all of the independently controlled and regulated outputs in accordance with the teachings herein.

As discussed above problems may arise prior to steady state when the multi-output power converter system 100 operates in start-up. According to the teachings herein, the multi-output power converter system 100 can address start-up problems through circuit and control methods applied within the system control module 108 and the secondary switches block 104. For instance, as illustrated in FIG. 2B, a variable reference generator 172 may be used within the system control module 108 to provide a monotonically increasing voltage reference. As described herein, a monotonically increasing voltage reference can advantageously be used to control the transient response of one or more of the multiple output voltages $V_{O1}$-$V_4$ during start-up.

Figure 3A:
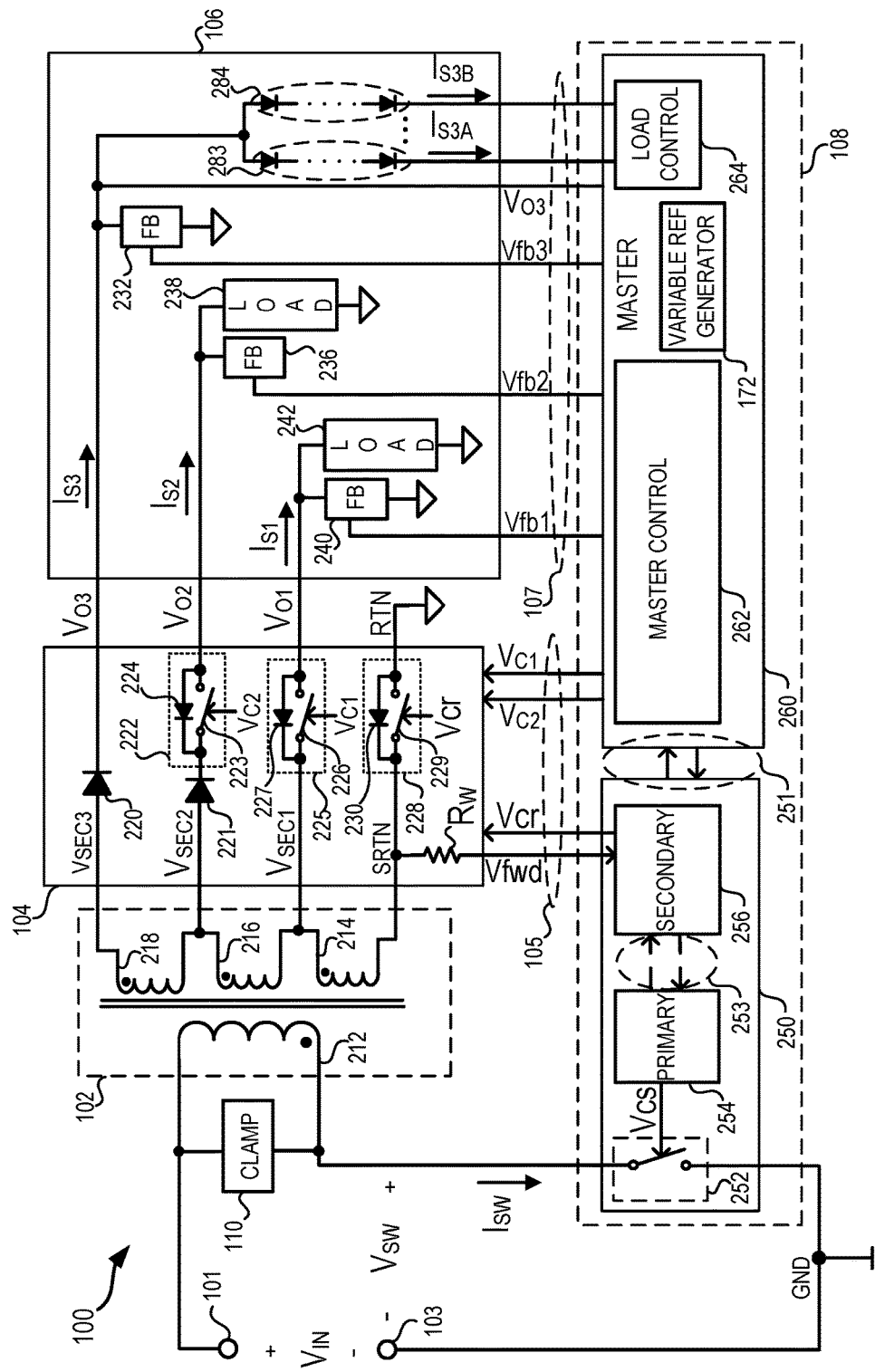
FIG. 3A illustrates a system block diagram of a multi-output power converter system for providing regulated power to CC and CV outputs according to an embodiment.

FIG. 3A illustrates a system block diagram of the multi-output power converter system 100 for providing regulated power to CC and CV outputs according to an embodiment. In the embodiment of FIG. 3A, the transformer 102 includes primary winding 212 and multiple series-connected secondary windings 214, 216, 218 for transferring rectified ac power to the secondary switches block 104. The secondary switches block 104 can receive secondary voltages $V_{SEC1}$-$V_{SEC3}$ relative to the secondary return potential SRTN and can provide the multiple output voltages $V_{O1}$-$V_{O3}$ and corresponding load currents $I_{S1}$-$I_{S3}$ to the multiple loads 106 relative to the secondary ground RTN.

In the embodiment of FIG. 3A the multiple loads 106 include multiple parallel-connected light emitting diode (LED) strings 283-284, a first load 242, and a second load 238. In addition, the multiple loads include feedback networks 240, 236, 232 which can respectively provide feedback signals Vfb1, Vfb2, Vfb3 to the system control module 108. In the steady state the multi-output power converter system 100 of FIG. 3A can be configured to regulate the power delivered to the LED strings 283-284 as a CC output (i.e., regulated $I_{SC3}$), regulate the power delivered to the first load 242 as a first CV (CV1) output (i.e., regulated $V_{O1}$), and regulate the power delivered to the second load 238 as a second CV (CV2) output (i.e., regulated $V_{O2}$).

Although the embodiment of FIG. 3A is configured to provide a CC output to LED strings 283-284 and to provide CV1 and CV2 outputs, other configurations having greater or fewer than one CC output and greater or fewer than two CV outputs (CV1, CV2) are possible.

The secondary switches block 104 includes diodes 220, 221 and switches 222, 225, 228. The diode 220 is electrically coupled between the secondary winding 218 and the multiple parallel connected LED strings 283-284 to receive the secondary voltage $V_{SEC3}$ and to provide the CC output having an output voltage $V_{O3}$ and a load current $I_{S3}$. The diode 221 and switch 222 are electrically coupled between the secondary winding 216 and the second load 238 to provide the CV2 output having an output voltage $V_{O2}$ and a load current $I_{S2}$; and the switch 225 is electrically coupled between the secondary winding 214 and the first load 242 to provide the CV1 output having an output voltage $V_{O1}$ and a load current $I_{S1}$. The switch 228 can provide the return path from the secondary ground RTN to the transformer secondary return potential SRTN.

The system control module 108 includes a slave subsystem block 250 and a master subsystem block 260. The slave subsystem block 250 includes a primary switch 252, a primary control block 254, and a secondary control block 256. The master subsystem block 260 includes a master control module 262, the variable reference generator 172, and a load control circuit 264.

The slave subsystem block 250 and the master subsystem block 260 may be electrically coupled to send and receive master-to-slave signals 251 for communicating information between the master subsystem block 260 and the slave subsystem block 250. In the steady state the master-to-slave signals 251 may be used to communicate steady-state control information and/or steady-state control signals between the master subsystem block 260 and the slave subsystem block 250. During start-up the master-to-slave signals 251 may also be used to communicate a start-up condition from the master subsystem block 260 to the slave subsystem block 250 so that the secondary control block 256 can send a handshake signal to the primary control block 254 via coupling signals 253.

In the steady state the primary control block 254 can provide a primary control signal Vcs to provide gate control to the primary switch 252 with a pulse width modulated (PWM) signal. During switching of the PWM signal, the clamp 110 can be used to clamp the peak value of voltage VSW; PWM control of the primary switch 252 allows energy to transfer from the primary winding 212 to the secondary windings 214, 216, 218. The secondary control block 256 can provide a gate control signal Vcr to switch 228 to control current flow from the secondary ground RTN through the secondary coils 214, 216, 218. The secondary return potential SRTN can be provided via a resistor Rw to the secondary control block 256; this may avail a forward control signal Vfwd for determining a switching state of the multi-output power converter system 100. In some configurations the forward control signal Vfwd may be used to monitor ringing (e.g., an idle ring measurement) to determine how to control the switch 228 and/or how to provide primary control signal Vcs to the primary switch 252. For instance, the secondary control block 256 may provide a gate control signal Vcr in response to the forward control signal Vfwd relative to a threshold value (e.g., negative two millivolts (−2 mV)); and the gate control signal Vcr may be provided such that the switch 228 turns on (i.e., operates in the on-state) and turns off (i.e., operates in the off-state) when the forward control signal Vfwd is less than or greater than the threshold value, respectively. Also, as illustrated in FIG. 3A, the primary control block 254 and the secondary control block 256 may be magnetically or optically coupled to provide control to the primary switch 252 via coupling signals 253.

In the steady state the master subsystem block 260 may communicate with the secondary switches block 104 in response to the load feedback signals 107 and may provide control signals $V_{C1}$ and $V_{C2}$ to control switch 225 and switch 222, respectively. In some embodiments the master control module 262 may use load feedback signals 107 including Vfb1, Vfb2, and/or Vfb3 to provide regulation to the multiple loads 106. For instance, control signal $V_{C1}$ can be used to provide gating signals to switch 225 to regulate the output voltage $V_{O1}$ (CV1 output); and control signal $V_{C2}$ can be used to provide gating signals to switch 222 to regulate the output voltage $V_{O2}$ (CV2 output). Additionally, the load control circuit 264 may be used to control the load current $I_{S3}$ (CC output) by controlling the LED string currents $I_{S3A}$ and $I_{S3B}$.

When the rectified ac line voltage $V_{IN}$ is initially applied and/or when the system control module 108 is initially enabled, the multiple output voltages $V_{O1}$-$V_{O3}$ may be zero and/or substantially zero. The primary control block 254 may receive power directly from the rectified ac line voltage $V_{IN}$ in order to provide the primary control signal Vcs to the primary switch 252; however, the secondary control block 256 and the master subsystem block 260, which may depend on one or more the multiple output voltages $V_{O1}$-$V_{O3}$ for power, may not initially have power. Therefore, the system control module 108 may initially have limited control functionality and/or initially operate in a "reset" state.

As discussed above, problems can arise during start-up. In the teachings herein additional circuit features within the secondary switches block 104 and within the master subsystem block 260 can be used to address start-up so that power may be applied to the multiple loads 106 without voltage droop. For instance, the master subsystem block 260 may include the variable reference generator 172 to provide a reference for controlling the multiple output voltages $V_{O1}$-$V_{O3}$; and the load control circuit 264 may be configured such that the load currents $I_{S1}$-$I_{S3}$ are reduced to zero or substantially zero amperes (amps) during start-up.

As shown in FIG. 3A, the switches 222, 225, 228 can be bidirectional switches allowing current to flow in two directions. For instance, switch 228 has a gated switch 229, gated by control signal Vcr, and has a diode 230. Switch 225 has a gated switch 226, gated by control signal $V_{C1}$, and has a diode 227; and switch 222 has a gated switch 223, gated by control signal $V_{C2}$, and has a diode 224. The diodes 224, 227, 230 may provide a conduction path when the control signals Vcr, $V_{C1}$, and $V_{C2}$ are not available. For instance, when switch 228 is in the off-state, current may flow from the secondary ground RTN to the secondary winding 214 via diode 230. During start-up, diode 230 can be used to allow a current path from the secondary ground RTN so that energy from the primary winding 212 is transferred to one or more of the secondary windings 214, 216, 218. For instance, during start-up, the control signals Vcr, $V_{C1}$, $V_{C2}$, may initially be unavailable and/or may initially cause switches 228, 225, 222 to operate in the off-state. Under these conditions, the diodes 220 and 230 can allow a conduction path from the secondary ground RTN so that energy from the primary winding 212 is transferred initially through the secondary windings 214, 216, 218 to increase the output voltage $V_{O3}$. Also as shown, the diodes 220 and 221 may block current towards the secondary windings 218 and 216, respectively.

Figure 3B:
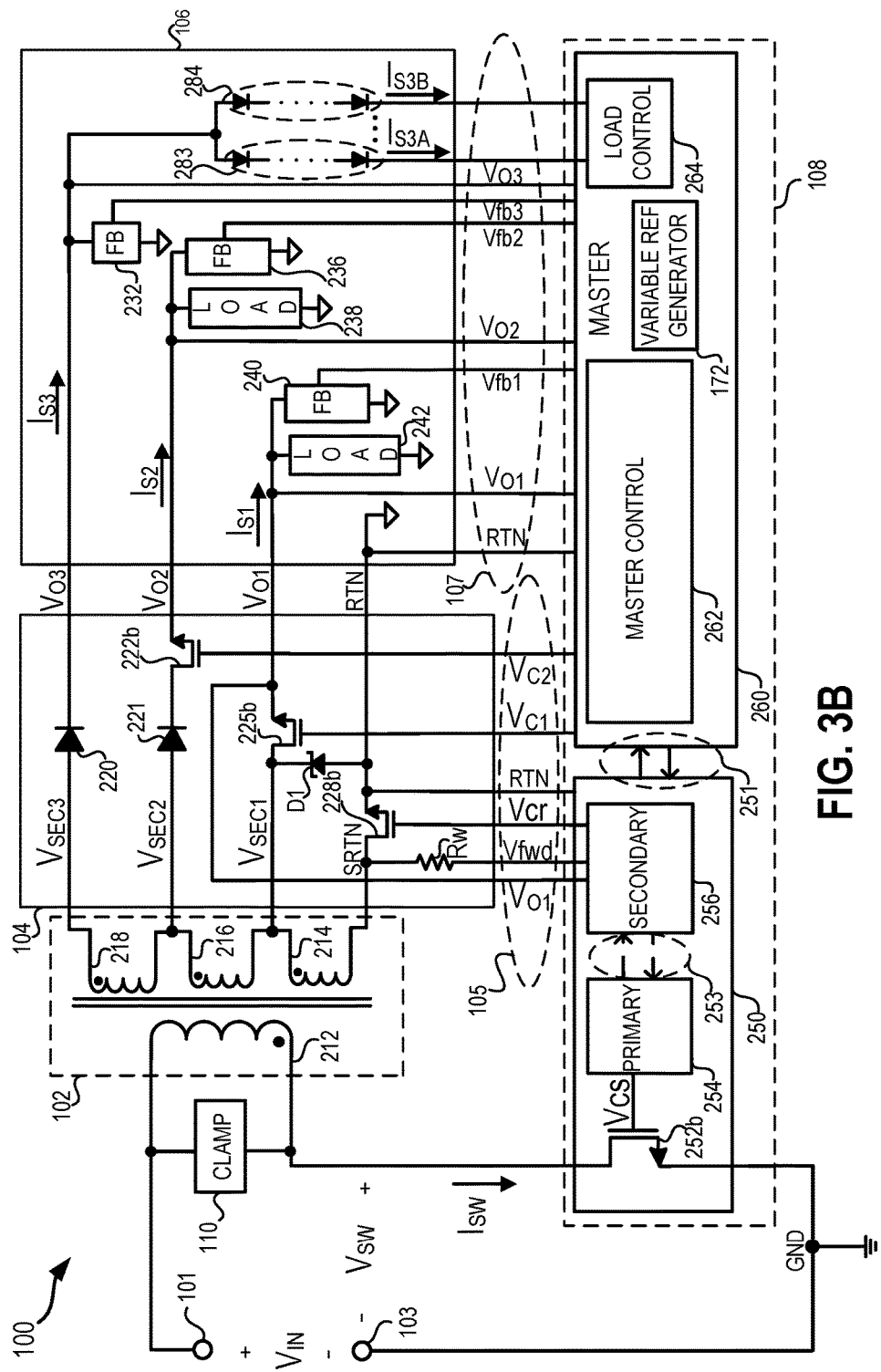
FIG. 3B illustrates a realization of the system block diagram of FIG. 3A using field effect transistors (FETs).

FIG. 3B illustrates a realization of the system block diagram of FIG. 3A using field effect transistors (FETs). The switches 222, 225, 228 can be realized with N-channel FETs 222b, 225b, 228b, respectively; and internal body diodes within FETs 222b, 225b, 228b can operate as the diodes 224, 227, 230, respectively. Additionally, Zener diode D1 can clamp the secondary voltage $V_{SEC1}$ and prevent the output voltage $V_{O1}$ from exceeding a Zener voltage. Also as shown, the primary switch 252 may be realized with an N-channel FET 252b. The secondary switch signals 105 may also include the output voltage $V_{O1}$, the forward control signal Vfwd, the control signals Vcr, $V_{C1}$, $V_{C2}$, and the secondary ground RTN; and the load feedback signals 107 may include the secondary ground RTN, the output voltages $V_{O1}$, $V_{O2}$, $V_{O3}$, the feedback signals Vfb1, Vfb2, Vfb3, and the LED string currents $I_{S3A}$, $I_{S3B}$. As shown the secondary ground RTN and the multiple output voltages $V_{O1}$, $V_{O2}$, $V_{O3}$ may provide power to the secondary control block 256 and the master subsystem block 260.

Although, the embodiment of FIG. 3B shows a realization of the multi-output power converter system 100 using N-channel FETs 222b, 225b, 228b, and 252b to realize active switches 222, 225, 228 and primary switch 252, respectively, other configurations are possible. As one of ordinary skill in the art can appreciate, switches may be realized using integrated and/or discrete semiconductor components including insulated gate bipolar transistors (IGBTs) and/or opposite polarity FETs (e.g., P-channel FETs); and active devices may be realized using material processes based on silicon, silicon germanium, gallium arsenide, and the like. Also, although the multiple loads 106 of FIG. 3A are shown as having two LED strings 283, 284, loads using greater or fewer than two LED strings 283, 284 are possible.

Figure 3C:
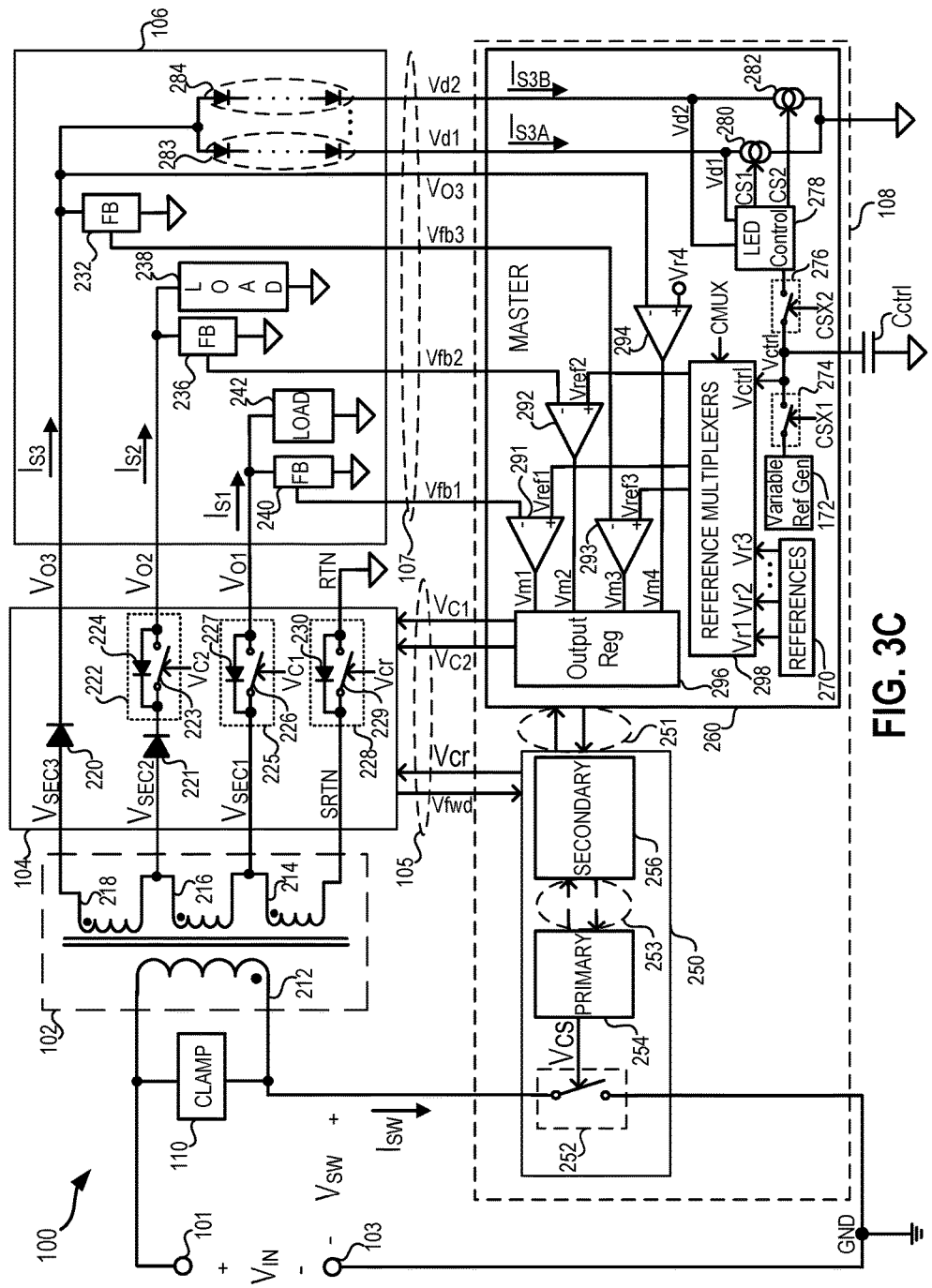
FIG. 3C illustrates a detailed block diagram of the multi-output power converter system of FIG. 3A.

FIG. 3C illustrates a detailed block diagram of the multi-output power converter system 100 of FIG. 3A. FIG. 3C shows an embodiment of the master subsystem block 260 with control loops for regulating the CV1, CV2, and CC outputs. The master subsystem block 260 includes comparators 291-294, an output regulator block 296, reference multiplexers block 298, a references generator 270, the variable reference generator 172, multiplexer (mux) switches 274, 276, LED control block 278, and controlled current sources 280, 282.

During steady state, comparators 291-293 may respectively compare feedback signals Vfb1-Vfb3 with reference signals Vref1-Vref3 to provide control signals Vm1-Vm3 to the output regulator block 296. The output regulator block 296 may provide secondary switch control signals $V_{C1}$ and $V_{C2}$ based in part on the state of the comparators 291-293. As one of ordinary skill in the art can appreciate, control loops may be realized using other mixed signal and/or analog circuits, and the realization shown by the master subsystem block 260 is not to be considered limiting. For instance, in some configurations control loops could be realized using analog to digital converters (ADCs) and comparing the feedback signals Vfb1-Vfb3 with reference signals Vref1-Vref3 in the digital domain. The reference signals Vref1-Vref3 could be digitally created and compared with a digital representation of the feedback signals Vfb1-Vfb3.

Also during steady state, the LED control block 278 can function as part of the load control circuit 264 in order to control the LED string currents $I_{S3A}$, $I_{S3B}$. Based on current source potentials Vd1, Vd2, the LED control block can regulate the LED string currents $I_{S3A}$, $I_{S3B}$ by sending control signals CS1, CS2, respectively, to the controlled current sources 280, 282. In some embodiments values for the LED string currents $I_{S3A}$, $I_{S3B}$ may be determined by a customer application and/or specification; and the LED string currents $I_{S3A}$, $I_{S3B}$ may be regulated to reduce and/or substantially reduce power loss. In the steady state, control signals CSX1, CSX2 may respectively open switch 274 and close switch 276 to electrically couple a control capacitor Cctrl to the LED control block 278. Coupled to the LED control block 278, the control capacitor Cctrl can be used to operate as an integrator. For instance, during the steady state, the control capacitor Cctrl may be used to sample current source potentials Vd1, Vd2, integrate samples of the current source potentials Vd1, Vd2 over time, and provide a steady state value of the capacitor voltage Vctrl to the LED control block 278. The steady state value of the capacitor voltage Vctrl can be an integrated value of the current source potentials Vd1, Vd2 over time; and the steady state value of the capacitor voltage Vctrl may be provided as the reference Vref3 to comparator 293.

During start-up the LED control block 278 may function to reduce and/or prevent current flow in the LED strings 283, 284. Also, control signals CSX1, CSX2 may respectively close switch 274 and open switch 276 to couple control capacitor Cctrl to the variable reference generator 172 so that the control capacitor Cctrl provides a monotonically increasing capacitor voltage (i.e., control voltage) Vctrl. For instance, when electrically coupled to the control capacitor Cctrl, the variable reference generator 172 may provide a current which causes the capacitor voltage Vctrl to monotonically increase as a function of time.

Additionally, a reference multiplexers block 298 may be used to provide reference signals Vref1-Vref3 selectable from a plurality of reference potentials Vr1-Vr3 and the capacitor voltage Vctrl. As shown, the plurality of reference potentials Vr1-Vr3 may be generated by the references generator 270; and although FIG. 3C shows three generated reference potentials Vr1-Vr3, fewer or greater than three may be generated and provided to the reference multiplexers block 298. Additionally, a control signal CMUX may be used to control the selection of the reference signals Vref1-Vref3. For instance, during the steady state the control signal CMUX may select steady state values for the reference signals Vref1-Vref3.

Although the multi-output power converter system 100 of FIGS. 3A-3C shows a configuration for providing and controlling power delivered to the multiple loads 106 as a CC output to the LED strings 283, 284, as a CV1 output to the load 242, and as a CV2 output to the load 238, other configurations are possible. For instance, in some configurations a load may not require regulation. Alternatively, and additionally, some applications may have fewer or greater CC and/or CV regulated loads.

Figure 4:
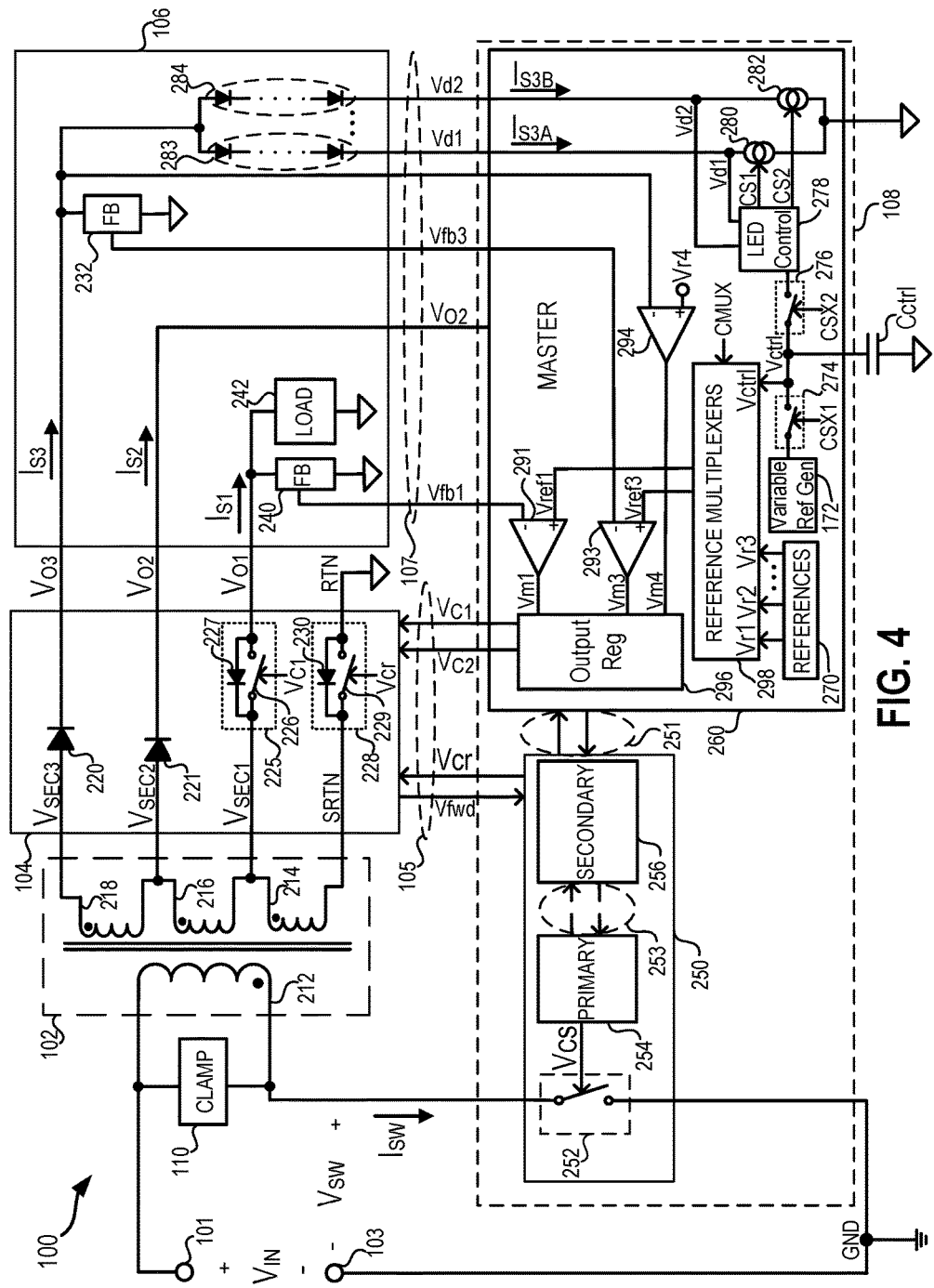
FIG. 4 illustrates a detailed block diagram of a multi-output power converter system for providing regulated power to CC and CV outputs according to another embodiment.

FIG. 4 illustrates a detailed block diagram of the multi-output power converter system 100 for providing regulated power to CC and CV outputs according to another embodiment. The multi-output power converter system 100 of FIG. 4 is similar to the multi-output power converter system 100 of FIG. 3C except it does not provide a regulated CV2 output to a load 238. Instead, the output voltage $V_{O2}$ is unregulated and provides an unregulated voltage to the master subsystem block 260. The output voltage $V_{O2}$ may be used within the master subsystem block 260 as an auxiliary unregulated supply voltage without a control loop, without comparator 292, and without switch 222.

Figure 5:
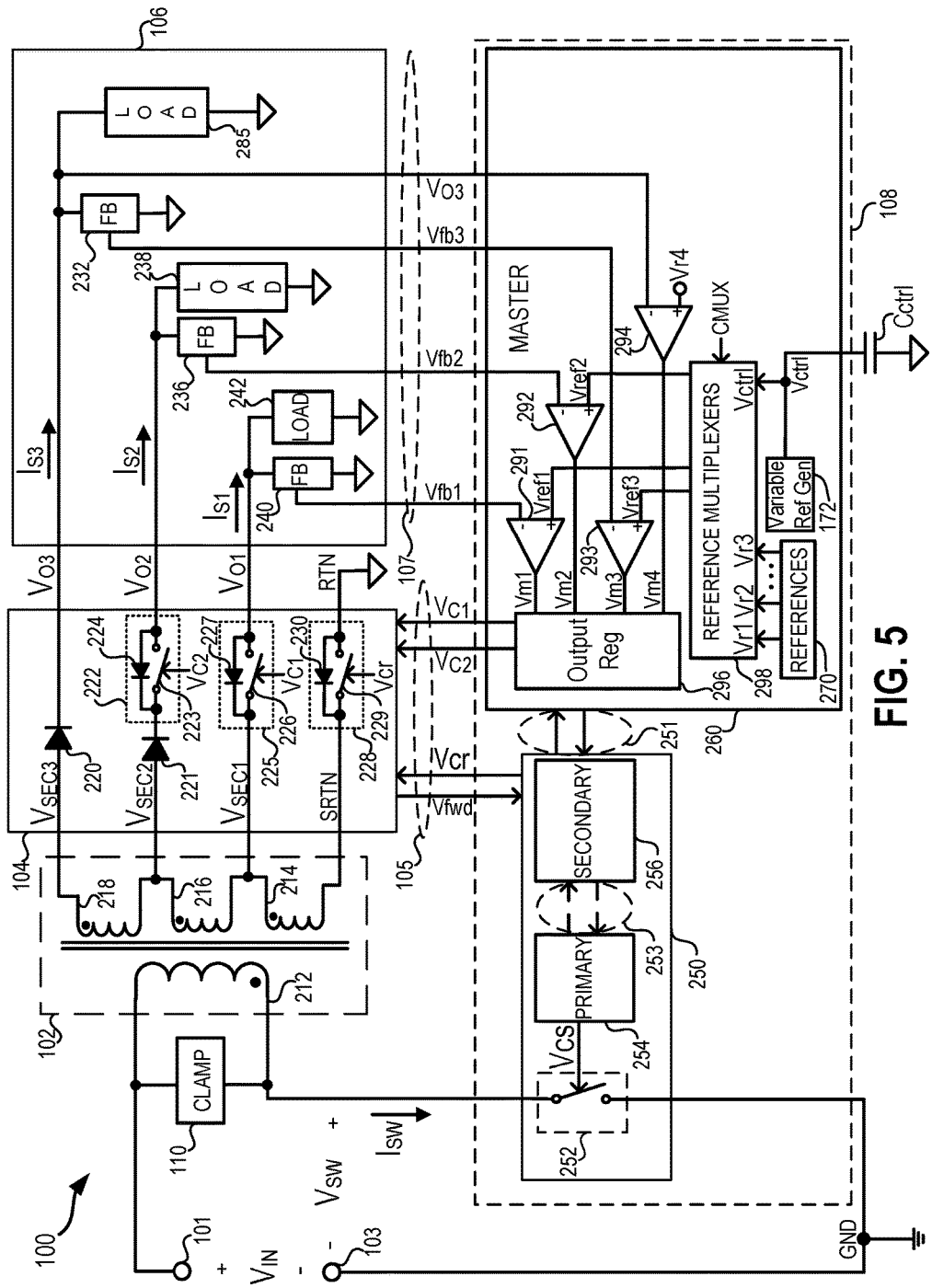
FIG. 5 illustrates a detailed block diagram of a multi-output power converter system for providing regulated power to CV outputs according to an embodiment.

FIG. 5 illustrates a detailed block diagram of a multi-output power converter system 100 for providing regulated power to CV outputs according to an embodiment. The multi-output power converter system 100 of FIG. 5 is similar to the multi-output power converter system 100 of FIG. 3C except it does not provide a CC output to LED strings 283, 284. Instead, the output voltage $V_{O3}$ is regulated so that power may be delivered to a load 285 as a CV (CV3) output (i.e., regulated $V_{O3}$). Because the delivered power is provided as a CV3 output, the master subsystem block 260 may be implemented without using the LED control block 278. As shown the variable reference generator 172 may be electrically coupled to the control capacitor Cctrl without switch 274.

Figure 6:
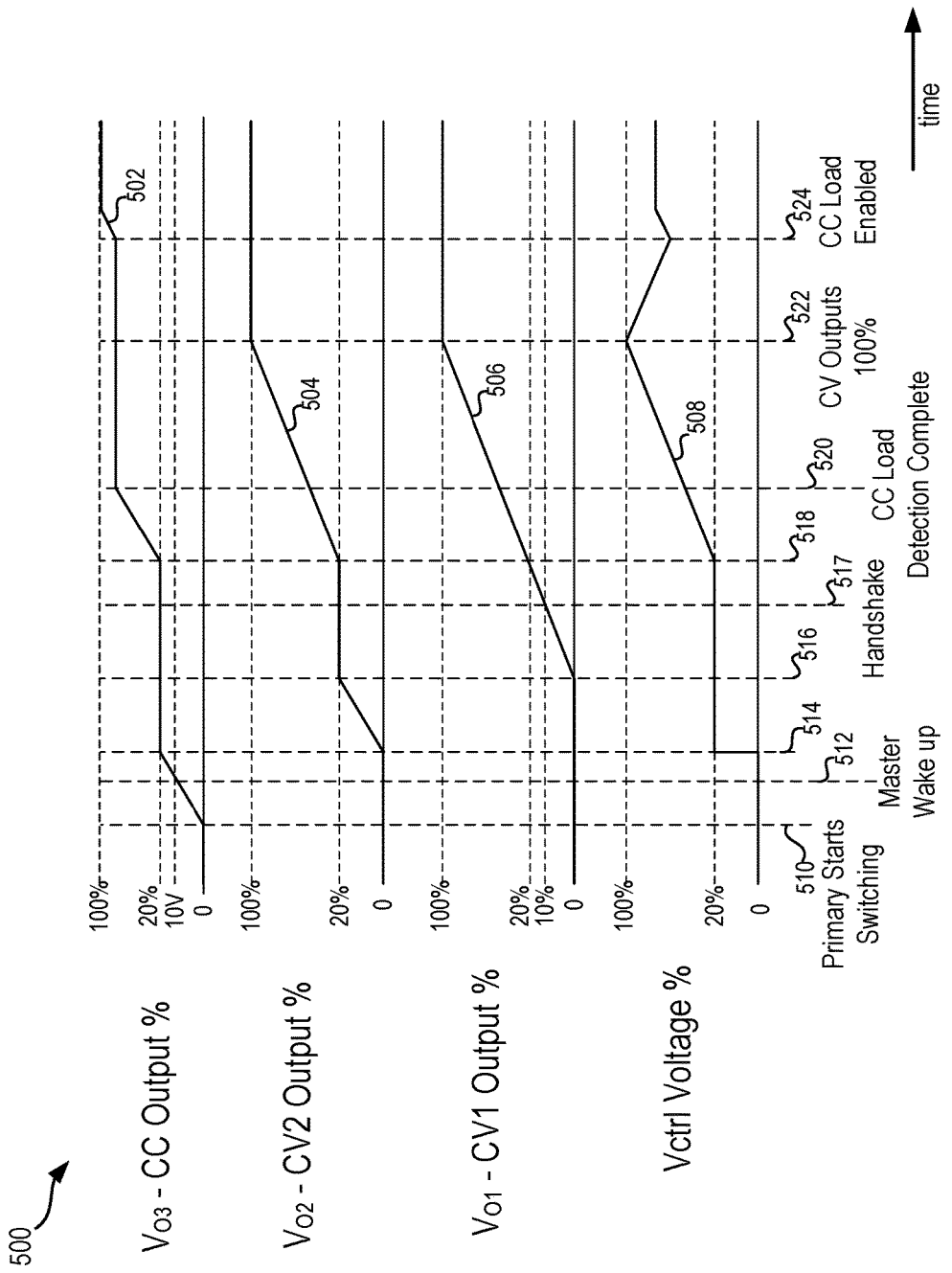
FIG. 6 illustrates CC and CV output waveforms during system start-up according to an embodiment.

FIG. 6 illustrates CC and CV output waveforms 502, 504, 506, 508 during system start-up according to an embodiment. With reference to FIG. 3C, waveforms 502, 504, and 506 are output voltage waveforms at the CC output (i.e., voltage $V_{O3}$), the CV2 output (i.e., voltage $V_{O2}$), and the CV1 output (i.e., voltage $V_{O1}$), respectively, and waveform 508 is the capacitor voltage Vctrl. Each waveform 502, 504, 506, 508 is plotted as a function of time with the start-up transient delineated over time by the occurrence of system start-up events 510, 512, 514, 516, 517, 518, 520, 522, 524.

With reference to FIGS. 3A-C, initially prior to event 510 rectified ac power (i.e., rectified ac line voltage $V_{IN}$), also referred to as "mains power," may be applied. After a wait and listen time, at event 510 the primary can start switching at a soft-start (low) frequency. An example soft-start frequency can be 25 kilohertz (kHz) or approximately 25 kHz. The master subsystem block 260 may be configured to receive power from output voltage $V_{O3}$ and therefore be in a reset (lockout) state. During this period the load current $I_{S3}$ may be zero or almost zero due to a high impedance state presented by the load control circuit 264. In this way energy may be transferred from the primary coil 212 to the CC output (i.e., voltage $V_{O3}$) such that the CC output monotonically increases without being loaded by the LED strings 283, 284. Also when the subsystem block 260 is not in the reset state, the switches 274, 276 may be controlled so that the variable reference generator 172 is electrically coupled to the control capacitor Cctrl.

Once the CC output rises to a sufficient voltage, the master subsystem block 260 may begin to operate. The value of $V_{O3}$ where the master subsystem block 260 begins to operate may be device and circuit dependent, and can be referred to as a "wake-up" voltage. As shown on waveform 502, the value of voltage $V_{O3}$ at event 512 can be approximately equal to 10 volts (e.g. 9.9 volts); however, as one of ordinary skill in the art can appreciate, a wake-up voltage can be set by design and also by circuit parameters. For instance, in some applications a wake-up voltage can be greater and/or lesser than 10 volts. With reference to FIG. 3C, the wake-up voltage may be set by the reference Vr4 using the control loop including comparator 294.

At event 512 the CC output reaches the wake-up voltage (e.g., approximately 10V) and may be enabled such that the control loop and circuits of the master subsystem block 260 may operate. The CC output may continue to rise until it reaches a first target percentage delineated by event 514. As shown the first target percentage may be 20 percent of the maximum; however, as one skilled in the art can appreciate, a first target percentage greater or lesser than 20 percent may also be selected. If the value of $V_{O3}$ at event 512 is already greater than 20 percent, then event 512 and 514 may occur simultaneously.

At event 514 the capacitor voltage Vctrl may be controlled to be equal to 20 percent of its maximum value and multiplexed via the reference multiplexers block 298 so that the reference voltages Vref1-Vref3 each equal Vctrl. Also at event 514 the output regulator block 296 may control switch 222 with control signal $V_{C2}$ to allow energy to be transferred to the CV2 output (i.e., voltage $V_{O2}$). The output regulator block 296 and control loop including comparator 292 may allow energy from the primary coil 212 to be diverted to the CV2 output and to provide load current $I_{S2}$ to the load 238. As the CV2 output rises and energy is diverted to the CV2 output, the CC output may remain regulated via the output regulator 296. If the CC output begins to droop, then the output regulator 296 may temporarily divert energy back to the CC output. In this way the output regulator and control loops including comparators 291-294, may allow the CV2 output to rise while preventing droop in the CC output.

At event 516 the output regulator block 296 may control switch 225 with control signal $V_{C1}$ to allow energy to be transferred to the CV1 output (i.e., voltage $V_{O1}$) while both the CC and CV2 outputs are regulated to 20 percent of their maximum values. The output regulator block 296 and control loop including comparator 291 may allow energy from the primary coil 212 to be diverted to the CV1 output and to provide load current $I_{S1}$ to the load 242. As the CV1 output rises and energy is diverted to the CV1 output, the CC output and the CV2 output may remain regulated via the output regulator block 296. If the CC output and/or the CV2 output begin to droop, then the output regulator block 296 may temporarily divert energy back to the CC output and/or the CV2 output. In this way the output regulator and control loops including comparators 291-294, may allow the CV1 output to rise while preventing droop in the CC output and the CV2 output.

The CV1 output (i.e., voltage $V_{O1}$) may supply power to a load 242 and to voltage sensitive logic circuits within the system control module 108. When the CV1 output reaches a sufficient voltage level, then the master-to-slave signals 251 may communicate a start-up condition indicative of the CV1 output voltage level from the master subsystem block 260 to the slave subsystem block 250. In response to the master-to-slave signals 251, the secondary control block 256 may perform "handshaking" with the primary control block 254 by sending a handshake signal via coupling signals 253. At event 517 the CV1 output reaches sufficient voltage (e.g., 10 percent of its maximum) such that the primary control block 254 may provide the primary control signal Vcs at a higher switching frequency. At event 517 the system control module 108 can allow handshaking with idle ring measurement. Idle ring measurement can refer to measuring a period of time during which the forward control signal Vfwd undergoes ringing. Event 517 may more generally represent a system event which allows the multi-output power converter system 100 to transition from operating at a soft start frequency (e.g., 25 kHz) to operating at much higher frequencies. Operating at higher frequencies greater than 25 kHz advantageously allows the multi-output power converter system 100 to regulate heavy loads including the LED strings 283, 284.

The CV1 output continues to increase until event 518. Event 518 occurs when the CV1 output reaches a first CV1 target value (e.g., 20 percent of its maximum). Starting at event 518 the control capacitor Cctrl and the variable reference generator 172 may be used to monotonically increase the capacitor voltage Vctrl. As the CC output (i.e., voltage $V_{O3}$), CV2 output (i.e., voltage $V_{O2}$), and the CV1 output (i.e., voltage $V_{O1}$) are regulated by the output regulator block 296 and comparators 291-293, $V_{O0}$-$V_{O3}$ may concurrently be controlled by the monotonically increasing capacitor voltage Vctrl. In this way the CC output, CV2 output, and the CV1 output may monotonically increase with the capacitor voltage Vctrl starting at event 518. As one of ordinary skill in the art may appreciate, even though the variable reference generator 172 of FIG. 3C uses a capacitor Cctrl to generate a monotonically increasing capacitor voltage Vctrl, other circuit approaches may be used to generate an increasing voltage.

At event 520 the master subsystem block 260 may determine a loading condition via the LED control block 278. Concurrently the CV2 output and CV1 output may continue to follow the monotonically increasing capacitor voltage Vctrl until event 522 where each reaches 100 percent of maximum. Following event 522 the control capacitor Cctrl may be discharged to a different value; and at event 524 the switches 274, 276 may switch states to allow the control capacitor Cctrl to be used as an integrator. Also following event 520 the reference multiplexers block 298 may provide the desired steady state regulation values for reference signals Vref1-Vref3.

Figure 7:
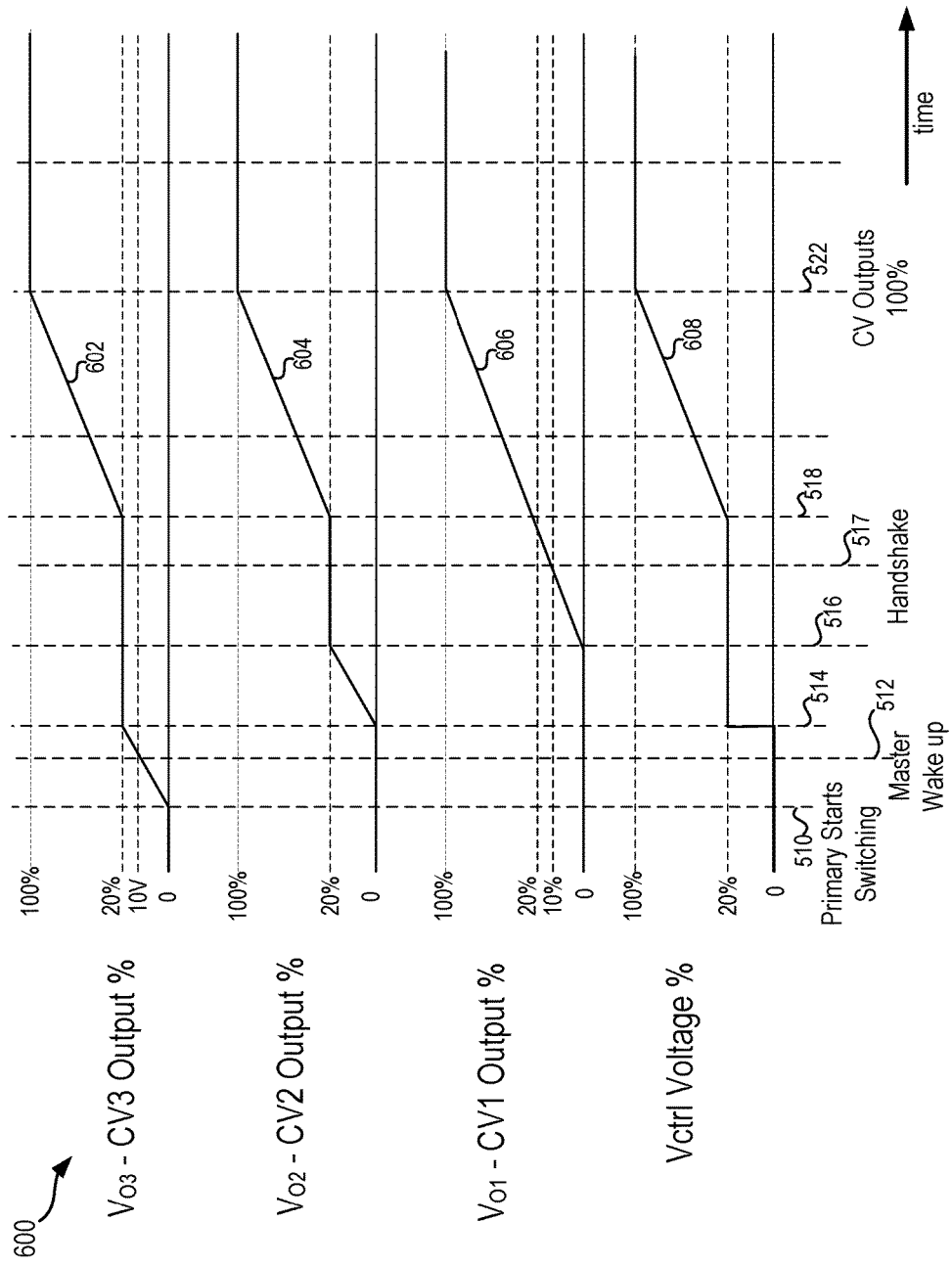
FIG. 7 illustrates CV output waveforms during system start-up according to an embodiment.

FIG. 7 illustrates CV output waveforms 602, 604, 606, 608 during system start-up according to an embodiment. With reference to FIG. 5, waveforms 602, 604, and 606 can correspond to output voltage waveforms at the CV3 output, the CV2 output, and the CV1 output, respectively, and waveform 608 can correspond to a waveform of the capacitor voltage Vctrl. Similar to FIG. 6 waveforms 502, 504, 506, and 508, each waveform 602, 604, 606, 608 is plotted as a function of time with the start-up transient delineated over time by the occurrence of system start-up events 510, 512, 514, 516, 517, 518, 522. Unlike the time delineated events presented in FIG. 6, those of FIG. 7 do not include CC output related events 520 and 524.

Figure 8:
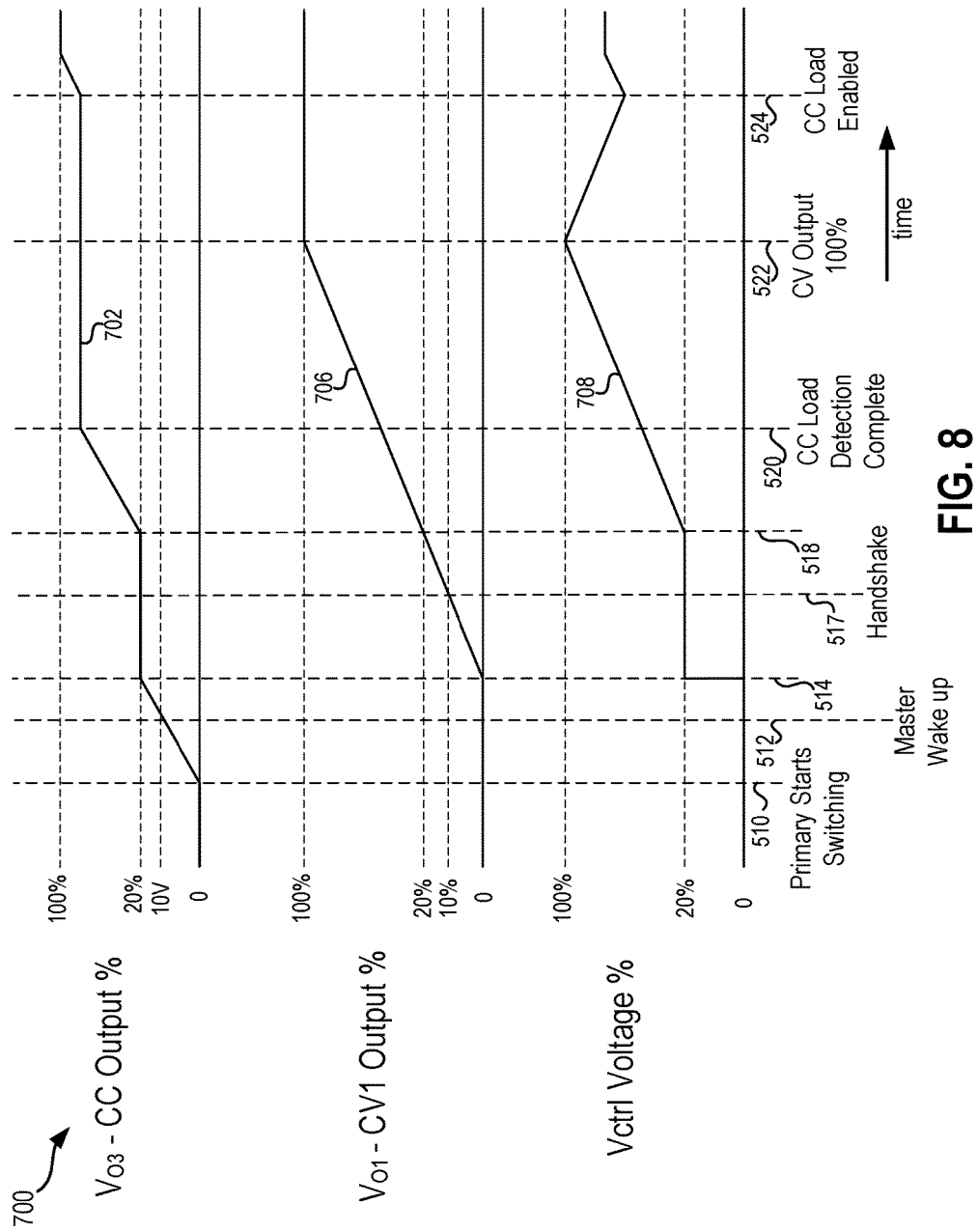
FIG. 8 illustrates CC and CV output waveforms during system start-up according to another embodiment.

FIG. 8 illustrates CC and CV output waveforms 702, 706, 708 during system start-up according to another embodiment. With reference to FIG. 4, waveforms 702 and 706 can correspond to output voltage waveforms at the CC output, and the CV1 output, respectively, and waveform 708 can correspond to a waveform of the capacitor voltage Vctrl. Similar to FIG. 6 waveforms 502, 506, and 508, each waveform 702, 706, and 708 is plotted as a function of time with the start-up transient delineated over time by the occurrence of system start-up events 510, 512, 514, 517, 518, 520, 522 and 524. Unlike the time delineated events presented in FIG. 6, those of FIG. 8 do not include CV2 output related event 516, which corresponds to regulating output voltage $V_{O2}$.

As illustrated by FIGS. 6-8, outputs in the multi-output power converter system 100 may be controlled during start-up to advantageously allow the multiple outputs $V_{O1}$-$V_{O3}$ to rise monotonically. In addition, the control method causes the CV1 output to rise concurrently and/or after the other outputs (i.e., voltages $V_{O2}$, $V_{O3}$) have reached higher values; and control loops within the master subsystem block 260 may regulate output voltages $V_{O1}$-$V_{O3}$ even when the switching rate of the primary switch 252 is low (e.g. 25 kHz). As described below in FIG. 9, another feature relating to control of CC/CV outputs prior to handshaking relates to output regulation via the slave subsystem block 250.

Figure 9:
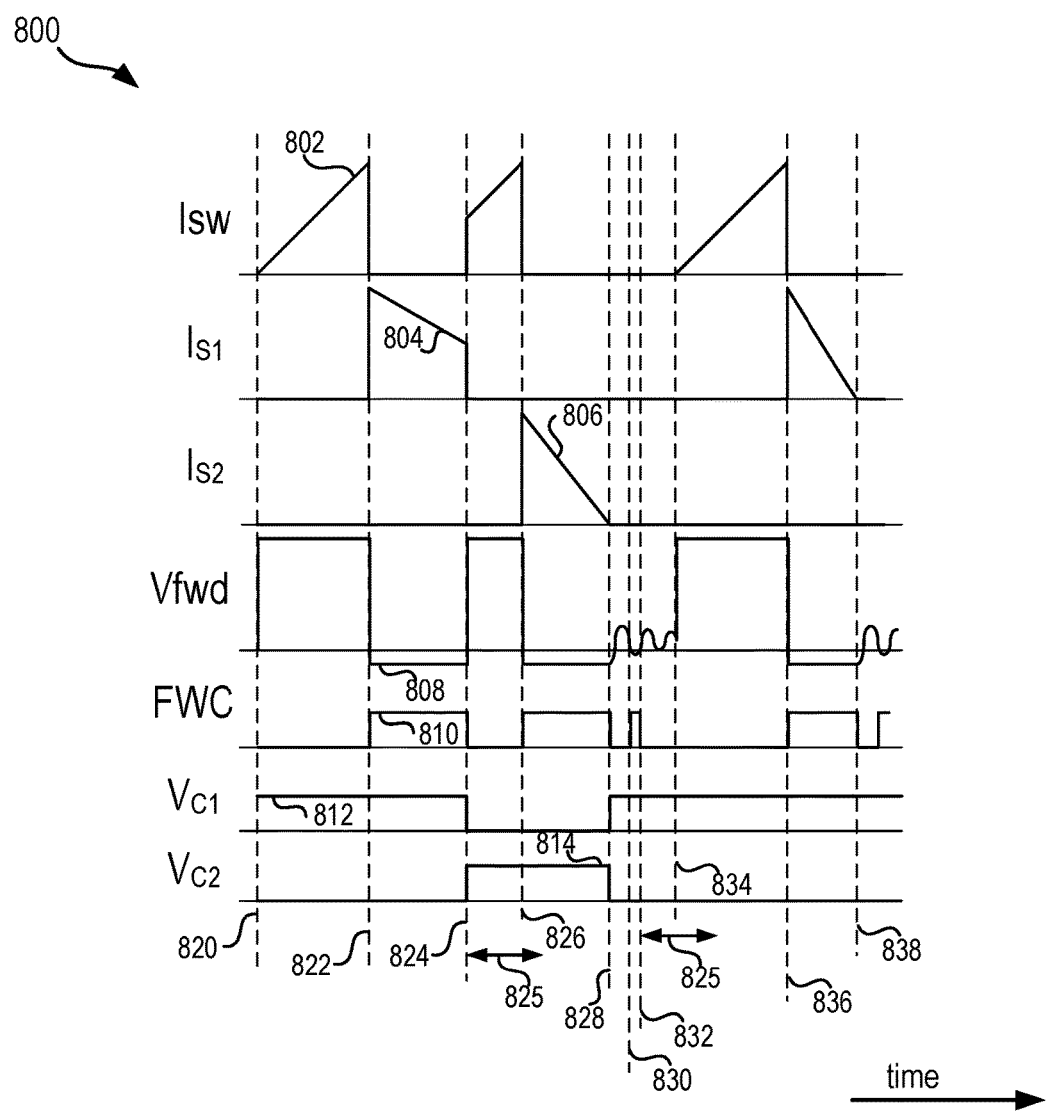
FIG. 9 illustrates voltage and current signal waveforms of a multi-output power converter system during system start-up according to an embodiment.

FIG. 9 illustrates voltage and current signal waveforms 802, 804, 806, 808, 810, 812, 814 of a multi-output power converter system 100 during system start-up according to an embodiment. The waveforms 802, 804, 806, 808, 810, 812, 814 can refer to primary switch current $I_{SW}$, load current $I_{S1}$ load current $I_{S2}$, the forward control signal (voltage) Vfwd, a logic signal FWC derived from the forward control signal Vfwd, switch control signal (voltage) $V_{C1}$, and switch control signal (voltage) $V_{C2}$. The waveforms 802, 804, 806, 808, 810, 812, 814 are plotted beginning at time 820 with switching transition edges delineated at times 822, 824, 826, 828, 830, 832, 836 and 838.

With reference to FIG. 6, the captured times between transition edges 822 and 838 may correspond to a time period after event 514 and before event 517. Prior to event 517 (i.e., prior to "handshaking"), the primary control block 254 may provide the primary control signal Vcs at a fixed frequency; and the multi-output power converter system 100 may operate at a fixed frequency (i.e., may operate under a fixed frequency condition) determined by the primary control block 254. During the fixed frequency condition prior to event 517, the master subsystem block 260 may also provide switch control signals $V_{C1}$ and $V_{C2}$ so that energy is transferred to a select one of the outputs (e.g., CV1, CV2, and CC outputs of FIG. 6) while regulating the remaining outputs.

Additionally, during the fixed frequency condition, the switch control signals $V_{CC}$ and $V_{C2}$ may be provided in response to a request for energy from a select one of CV1, CV2, and CC outputs; and the CV1, CV2, and CC outputs may be regulated by the switch control signals $V_{C1}$ and $V_{C2}$ so that the output voltages $V_{O1}$-$V_{O3}$ monotonically increase. For instance, as shown in FIG. 9, waveform 812 of the switch control signal $V_{C1}$ is high between times 820 and 824 so that energy is provided to the CV1 output via the load current $I_{S1}$ (waveform 804); also waveform 814 of the switch control signal $V_{C2}$ is high between times 826 and 828 so as to provide energy to the CV2 output via the load current $I_{S2}$ (waveform 806).

Also as shown in FIG. 9, waveform 810 of the logic signal FWC may change state (i.e., transition between logic states) in response to the forward control signal Vfwd (waveform 808) and may be used to indicate if a select one of the CV1, CV2, and CC outputs has "idle ringing". Idle ringing (also referred to as "idle ring") can occur when an output load current (e.g., load current $I_{S1}$ or $I_{S2}$) discharges prior to the transition of a switch control signal (e.g., switch control signal $V_{C1}$ or $V_{C2}$). Additionally, transitions of the logic signal FWC (waveform 810) can be compared relative to a time interval 825 (e.g., five microseconds (µs)) to advantageously determine an energy demand of the select one of the CV1, CV2, and CC outputs. For instance, at time 824, waveform 810 of the logic signal FWC changes state (i.e., transitions from high to low) when the switch control signal $V_{C1}$ (waveform 812) changes state. Also as shown by waveform 804, the load current $I_{S1}$ has a greater than zero magnitude and discharges to substantially zero current at time 824; in turn waveform 810 of logic signal FWC changes state in response to the forward control signal Vfwd (waveform 808) without ringing at time 824. Also by example and in contrast, the load current $I_{S2}$ (waveform 806) substantially discharges to zero prior to time 828; and in turn waveform 810 of the logic signal FWC changes state in response to the forward control signal Vfwd (waveform 808) with ringing (i.e., idle ringing) at times 828, 830, and 832. The master subsystem block 260 may use and compare the logic signal FWC (waveform 810) relative to the time interval 825 to determine that the CV2 output undergoes an "idle ringing" condition. Under the idle ringing condition the master subsystem block 260 may logically ignore the FWC signal.

Figure 10A:
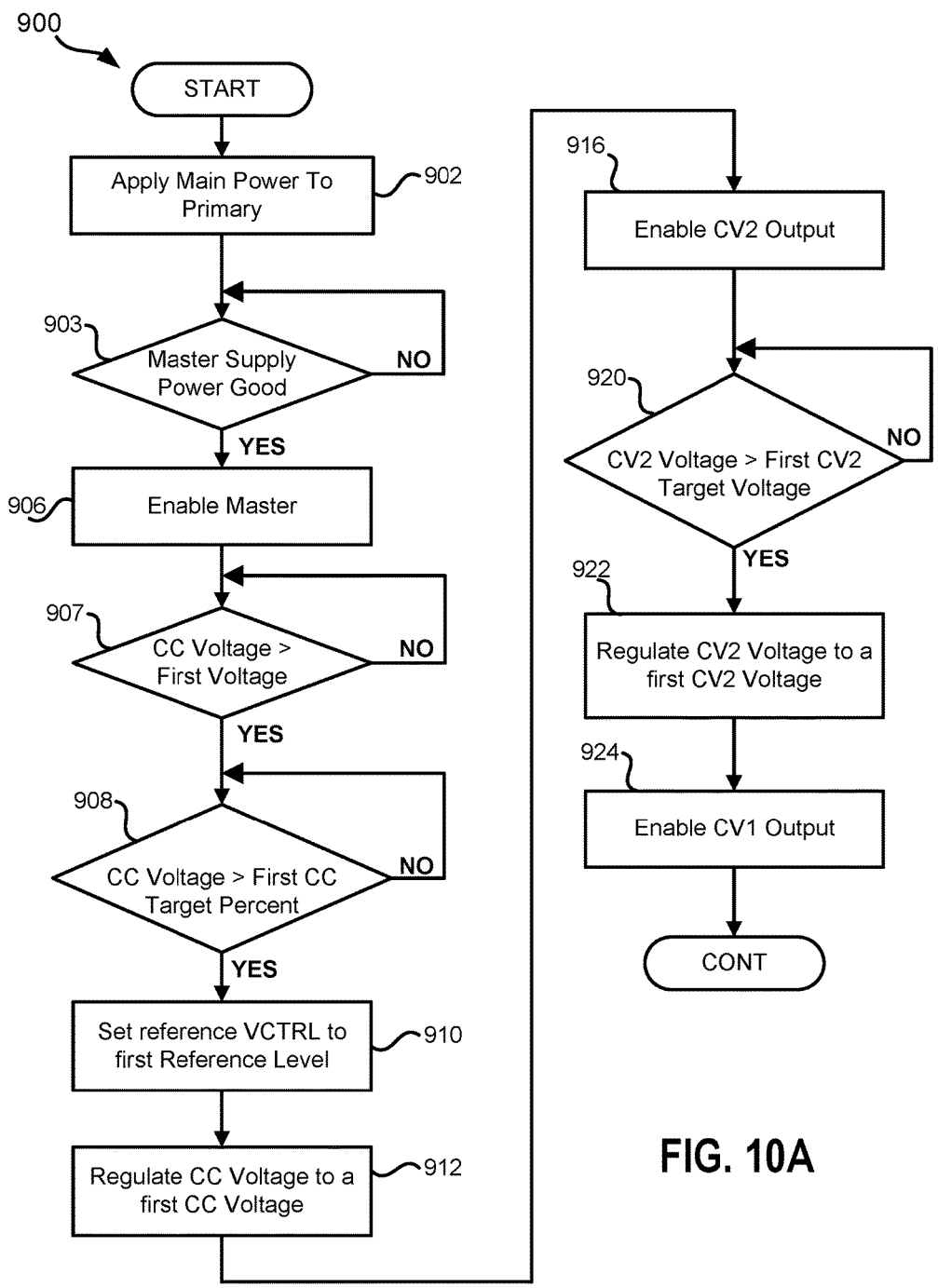
FIGS. 10A and 10B illustrate a flow chart of a start-up method for a multi-output power converter system providing regulated power to CC and CV outputs according to an embodiment.
Figure 10B:
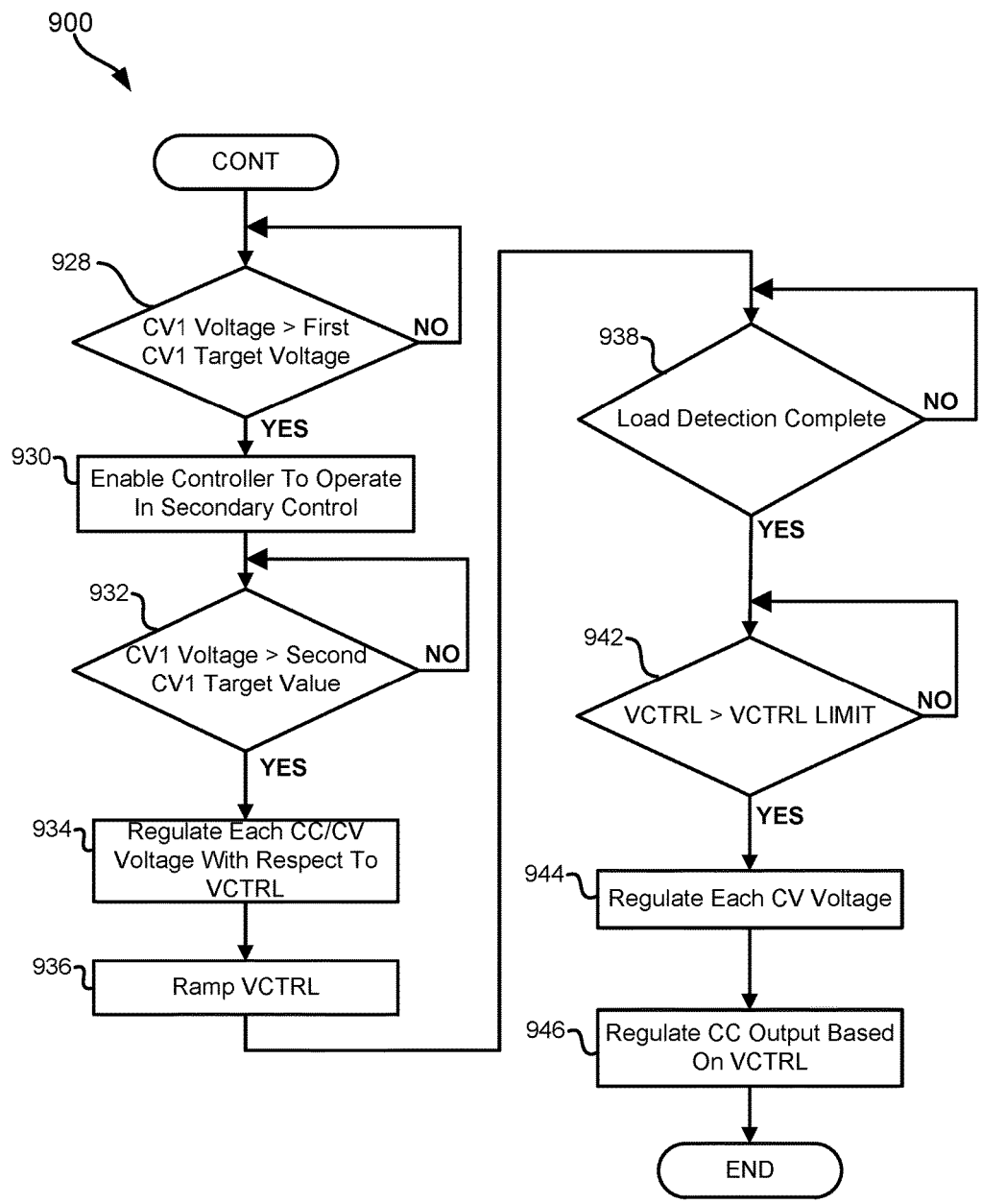

FIGS. 10A and 10B illustrate a flow chart of a start-up method 900 for a multi-output power converter system providing regulated power to CC and CV outputs according to an embodiment. Step 902 may correspond to applying power. Then with reference to FIGS. 2A-C and FIG. 6, decision step 903 may refer to the time prior to and including event 512 when comparator 294 compares output voltage $V_{O3}$ with a reference Vr4 (e.g. 10V). At event 512 the decision step proceeds to step 906 which may correspond to enabling the master subsystem block 260 (event 512). The next decision step 907 may correspond to the period between and including events 512 and 514. If the CC output is greater than a selected first voltage (e.g., 10V) then the method proceeds to decision step 908. Decision step 908 may correspond to using control features of master subsystem block 260 in order to determine if the CC output (i.e., voltage $V_{O3}$) has reached a target percentage (e.g., 20 percent) of the maximum.

Upon satisfying the condition of decision step 908 the method may continue to step 910, which may correspond to event 514 when the capacitor voltage Vctrl is set to a desired first reference level (e.g., 20 percent of maximum). Step 912 may also correspond to event 514 following which the CC output is regulated to the first CC voltage (e.g., the greater of 10V or 20 percent of the maximum). The next step 916 may also correspond to event 514 when the CV2 output is enabled following which the CV2 output is monotonically increased. Next a decision step 920 determines if the CV2 output has reached its first CV2 target value (e.g. 20 percent of its maximum value). When the condition of step 920 is satisfied, the method continues to step 922.

Step 922 may correspond to event 516 where the CV2 output becomes regulated to its first CV2 target value (e.g., 20 percent). The next step 924 may also correspond to event 516; at event 516 the CV1 output begins to increase monotonically. The next decision step 928 may determine when the CV1 output has reached its first CV1 target value (e.g., 10 percent of its maximum). The event 517 relating to handshaking can correspond to satisfying the condition of decision step 928. When the condition is satisfied, the method proceeds to step 930.

At step 930 the controller may operate at higher frequencies whereby the slave subsystem block 250 and the master subsystem block 260 provide control at a higher primary switching frequency. The next decision step 932 can decide if the CV1 output has reached its second target value (e.g., 20 percent of its maximum), and the event 518 may correspond to satisfying the condition of decision step 932. Upon satisfying the condition of decision step 932, the method proceeds to step 934.

Step 934 may correspond to the period following event 518 when the CC output (i.e., voltage $V_{O3}$) and the CV outputs (i.e., voltages $V_{O1}$ and $V_{O2}$) are regulated with respect to the capacitor voltage Vctrl. The next step 936 may also correspond to the period following and including event 518 while the capacitor voltage Vctrl is monotonically increased. The next decision step 938 determines if load detection is complete (i.e., event 520). Upon satisfying the condition of decision step 938, the method proceeds to decision step 942.

The decision step 942 may determine when the capacitor voltage Vctrl has reached its maximum corresponding to event 522. The next step 944 corresponds to the conditions following event 522 when the references signals Vref1-Vref3 may be set to their steady state values. Finally, step 946 may correspond to event 524, regulating the CC output load current (i.e., load current $I_{S3}$).

Figure 11A:
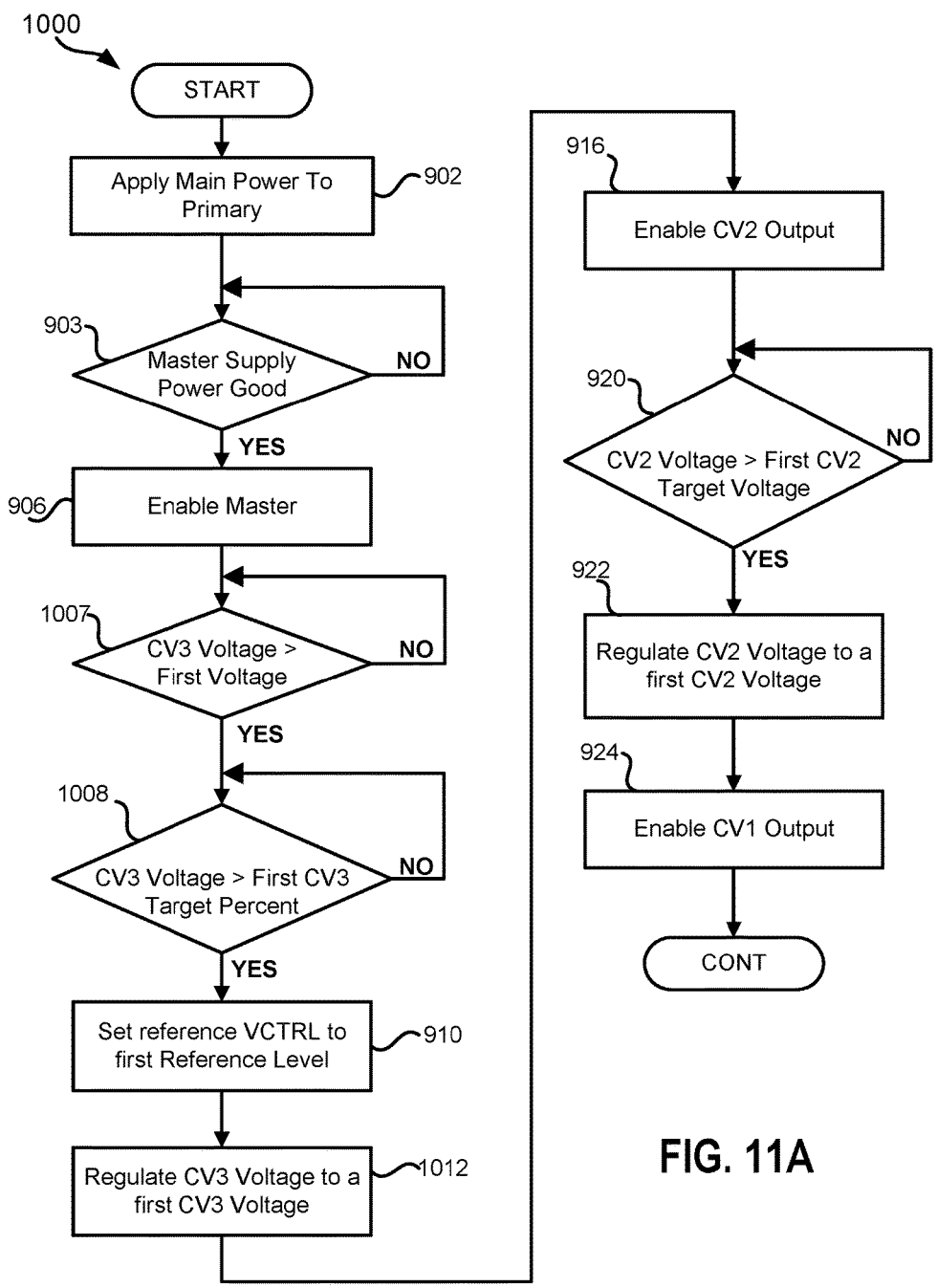
FIGS. 11A and 11B illustrate a flow chart of a start-up method for a multi-output power converter system providing regulated power to CV outputs according to an embodiment.
Figure 11B:
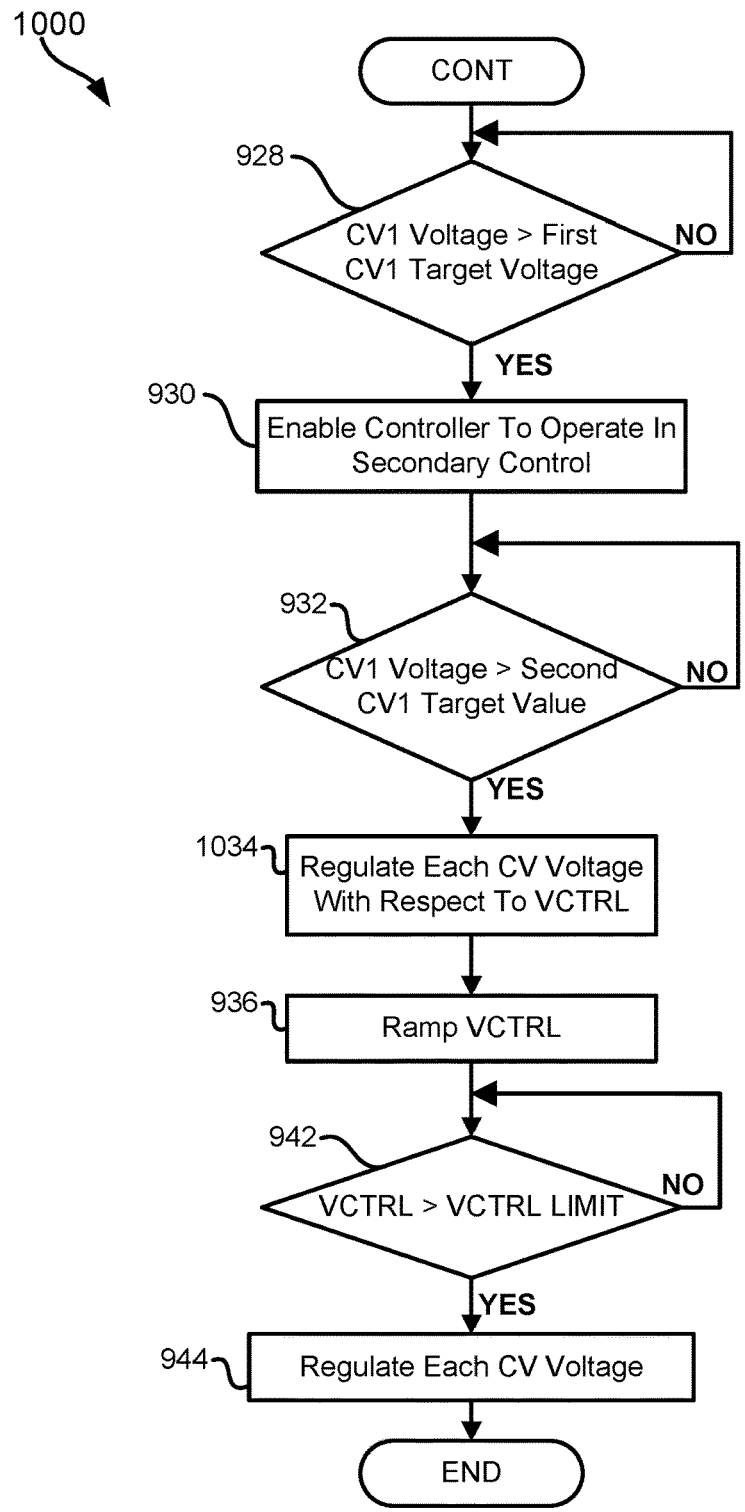

FIGS. 11A and 11B illustrate a flow chart of a start-up method 1000 for a multi-output power converter system providing regulated power to CV outputs according to an embodiment. The start-up method 1000 can be similar to start-up method 900 except steps relating to the CC output of start-up method 900 are replaced with steps corresponding to a regulated CV3 output (i.e., regulated $V_{O3}$). With reference to FIG. 5 and FIG. 7, the flow chart steps for start-up method 1000 are similar except steps 907, 908, and 912 are respectively replaced with CV3 output decision steps 1007, 1008, and 1012. Also step 934 is replaced with step 1034 corresponding to regulating each CV output (i.e., regulated voltages $V_{O1}$-$V_{O3}$). Additionally, start-up method 1000 does not include steps 938 and 946 corresponding to CC output events 520 and 524, respectively.

Figure 12A:
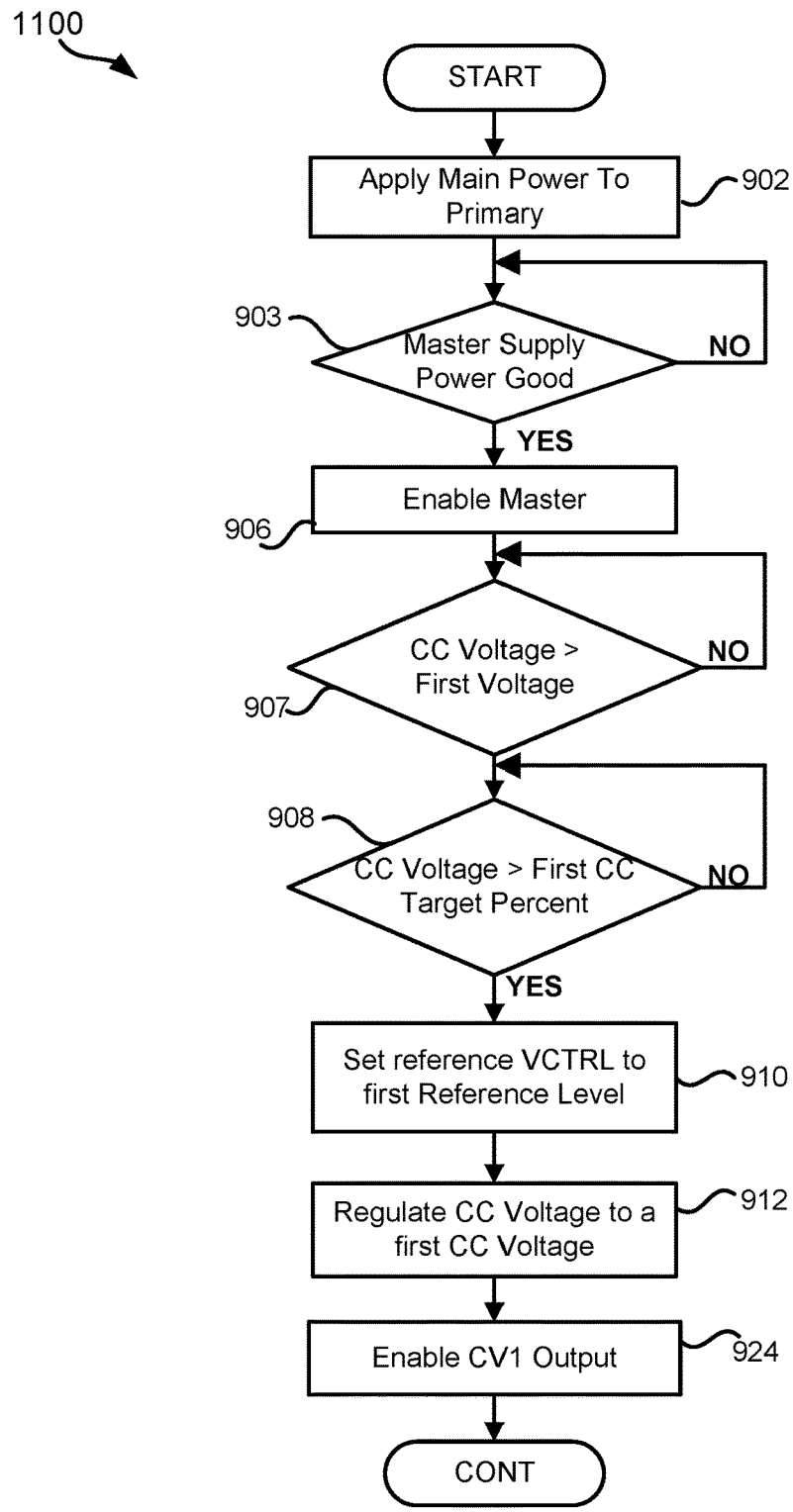
FIGS. 12A and 12B illustrate a flow chart of a start-up method for a multi-output power converter system providing regulated power to CC and CV outputs according to another embodiment.
Figure 12B:
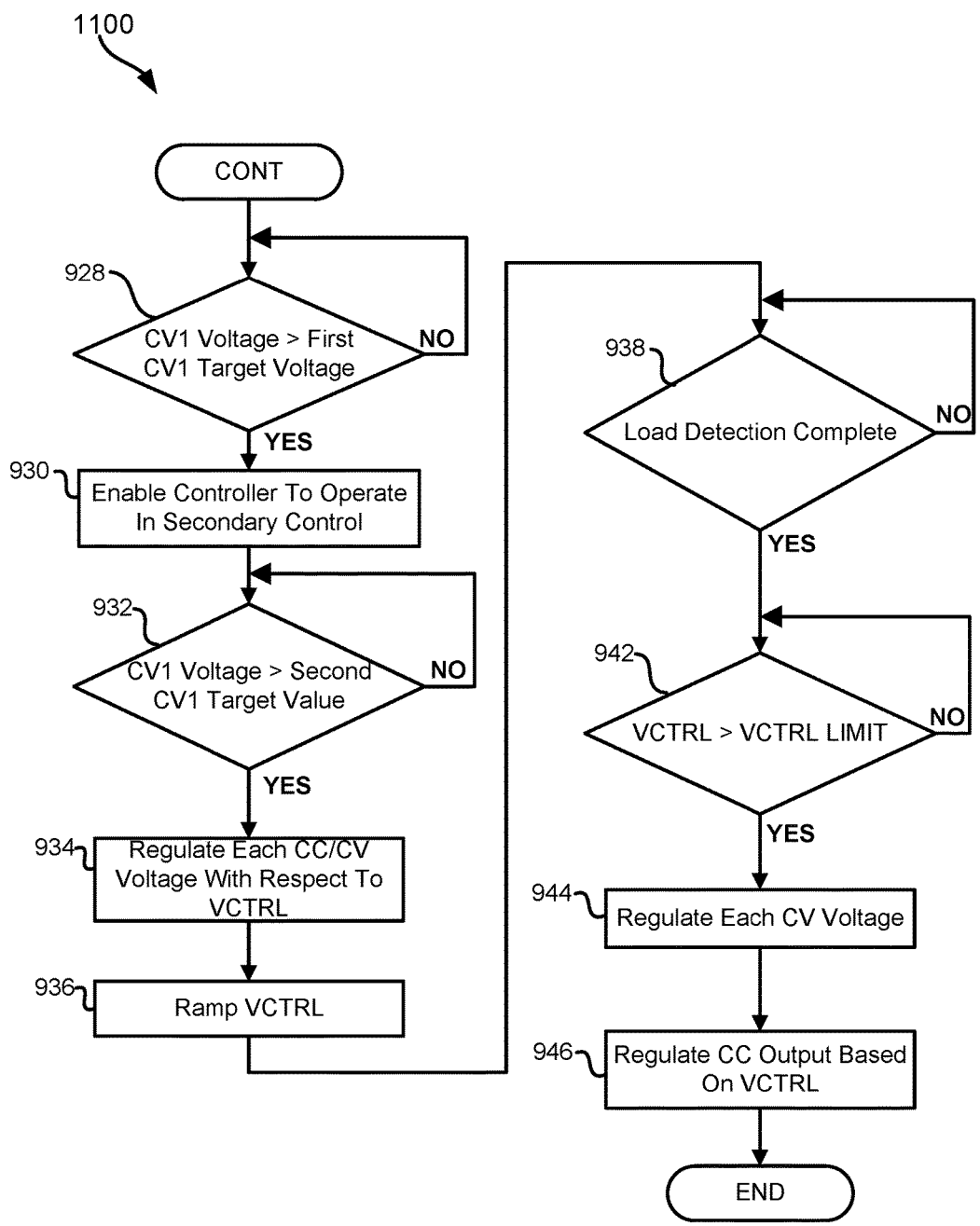

FIGS. 12A and 12B illustrate a flow chart of a start-up method 1100 for a multi-output power converter system providing regulated power to CC and CV outputs according to another embodiment. The start-up method 1100 can be similar to that of start-up method 900 except the steps relating to the CV2 output (i.e., voltage $V_{O2}$) have been removed. With reference to FIG. 4 and FIG. 8, the flow chart steps are similar except steps 916, 920, and 922 relating to the CV2 output have been removed.

Figure 13:
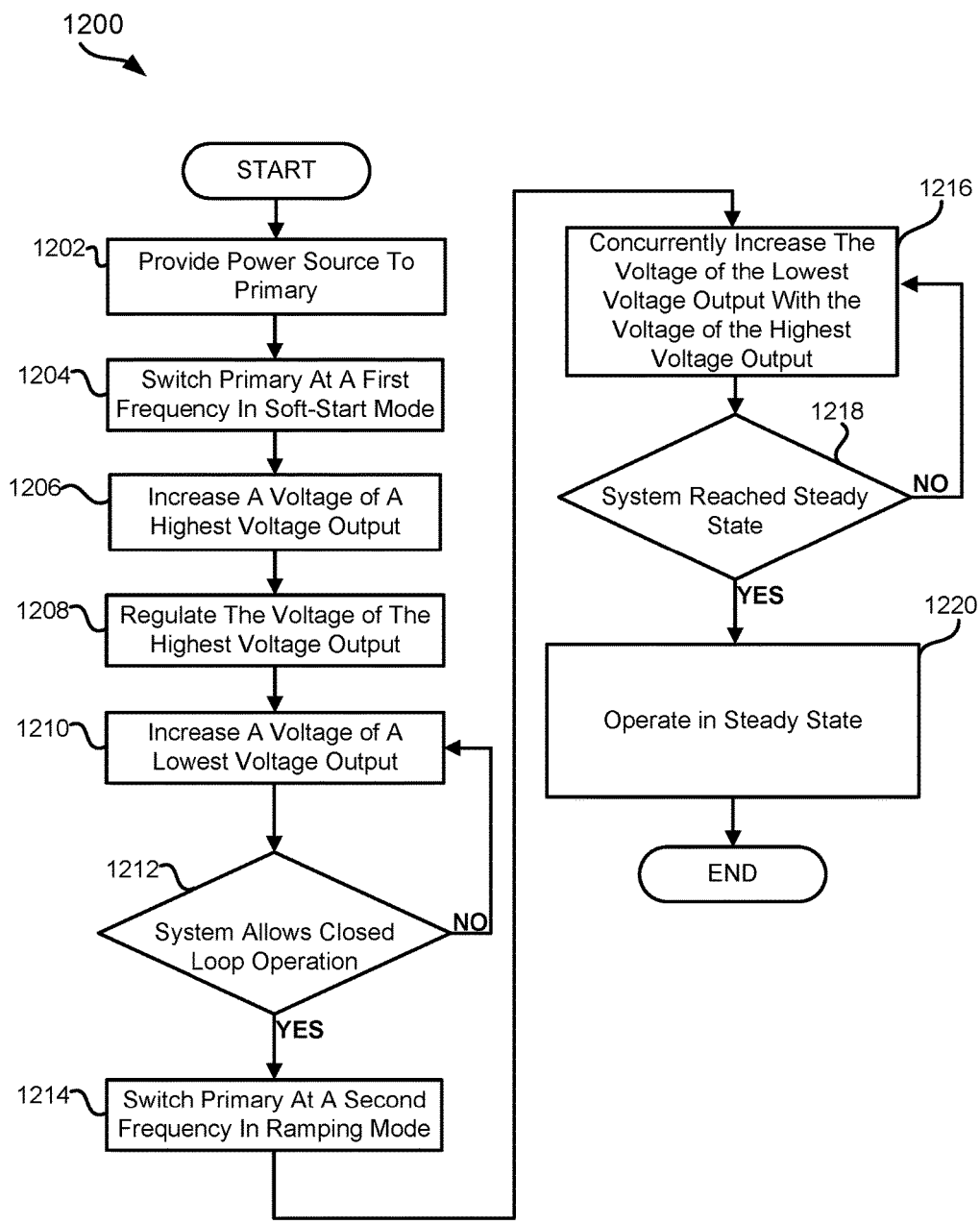
FIG. 13 illustrates a flow chart of a generalized start-up method for a multi-output power converter system providing regulated power to CC and/or CV outputs according to the teachings herein.

FIG. 13 illustrates a flow chart of a generalized start-up method 1200 for a multi-output power converter system providing regulated power to CC and/or CV outputs according to the teachings herein. With reference to FIGS. 6-8, method step 1202 can correspond to providing a rectified ac power source (e.g., "mains" power, and/or rectified ac lines voltage $V_{IN}$) prior to event 510. Step 1204 can correspond to event 510, driving the primary switch 252 using a low soft-start frequency. Step 1206 can correspond to increasing a voltage of a highest voltage output (e.g., voltage $V_{O3}$). Step 1208 can correspond to regulating the highest voltage output to a voltage level (e.g., 10V). Step 1210 may correspond to an event including events 514 and/or 516 during which a lower voltage output (e.g., voltage $V_{O1}$ and/or voltage $V_{O2}$) is increased. The decision step 1212 can correspond to a condition prior to a system wakeup event such as handshaking. Satisfying the condition of decision step 1212 may correspond to event 517. The next step 1214 may correspond to operating the multi-output controller system 100 at higher frequency with handshaking control. Step 1214 may also correspond to using a ramping reference generated by a variable reference generator 172. Step 1216 may correspond to the time period following event 518 during which the multiple outputs are concurrently increased (ramped). Decision step 1218 can represent a general condition delineating the steady state. For instance decision step 1218 may represent the condition that each output (i.e., each of voltages $V_{O1}$-$V_{O3}$) has reached a steady state value. Upon satisfying decision step 1218 the multi-output converter system 100 may proceed to step 1220 and operate in the steady state.

It is appreciated that in the description and example drawings, the concept of independently controlled CC/CV multiple outputs has been illustrated mostly with series couplings of the secondary windings on the energy transfer element (e.g., transformer). However, it should not be considered as a limitation and it is appreciated that based on the application and the load power requirement on each of multiple outputs, the independently regulated CV/CC outputs may be arranged in any coupling combination of series windings, parallel windings, or both series windings and parallel windings with a common return line for all of the independently controlled and regulated outputs in accordance with the teachings herein.

The proposed converter topology is one example of a single stage multi-output flyback converter targeting applications with multiple independently regulated constant voltage and/or constant current outputs. Example targets for such products may include monitor and television applications, which include a CC controlled output for the parallel strings (e.g., arrays) of backlight LEDs requiring regulated adjustable (e.g., dimming) constant current output with for example a 40-50 V voltage drop plus one or more CV controlled outputs for powering logic, universal serial bus (USB), and audio that should satisfy a strict regulation accuracy requirement for each output.

As presented herein, one aspect of the teachings is a method of sequencing output voltages in a multi-output switch-mode converter system. The method comprises: providing a power source; transferring energy from a primary to a highest voltage secondary output; and transferring energy from the primary to a lowest voltage secondary output. The power source is provided to the primary of the multi-output switch-mode converter system. Energy is transferred from the primary to the highest voltage secondary output so as to increase a voltage of the highest voltage secondary output. Also, energy is transferred from the primary to the lowest voltage secondary output so as to concurrently increase a voltage of the lowest voltage secondary output while regulating the voltage of the highest voltage secondary output. Additionally, energy is transferred from the primary to the highest voltage secondary output and the lowest voltage secondary output. Energy is transferred so as to concurrently increase the voltage of the highest voltage secondary output and the voltage of the lowest voltage secondary output.

In another aspect a multi-output power converter is configured to provide power to multiple loads. The multi-output power converter comprises a system control module, a transformer, and a secondary switches block. The transformer comprises a primary coil and a stacked secondary coil; the stacked secondary coil has a plurality of stacked secondary outputs. Also, the primary coil is electrically coupled to receive energy from a first power supply. The secondary switches block is electrically coupled to the plurality of stacked secondary outputs and comprises a plurality of outputs. The plurality of outputs comprises a highest voltage output and a lowest voltage output. During a start-up transient prior to reaching a steady state, the system control module is configured to control transference of energy from the primary coil to the plurality of outputs. During an initial soft-start phase, a voltage of the highest voltage output increases monotonically before a voltage of the lowest voltage output increases, and during a subsequent ramping phase, the voltage of the highest voltage output rises concurrently with the voltage of the lowest voltage output.

The above description of illustrated examples of the present disclosure, including what is described in the Abstract, are not intended to be exhaustive or to be limitation to the precise forms disclosed. While specific embodiments of, and examples for sequencing outputs in multi-output switch-mode converters and multi-output switch-mode converter systems are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

What is claimed is:

1. A method of sequencing output voltages in a multi-output switch-mode converter system comprising:
   providing a power source to a primary of the multi-output switch-mode converter system;
   transferring energy from the primary to a highest voltage secondary output so as to increase a voltage of the highest voltage secondary output;
   transferring energy from the primary to a lowest voltage secondary output so as to concurrently increase a voltage of the lowest voltage secondary output while regulating the voltage of the highest voltage secondary output, the voltage of the highest voltage secondary output greater than the voltage of the lowest voltage secondary output; and
   transferring energy from the primary to the highest voltage secondary output and the lowest voltage secondary output so as to concurrently increase the voltage of the highest voltage secondary output and the voltage of the lowest voltage secondary output.

2. The method of claim 1, wherein transferring energy from the primary to the highest voltage secondary output so as to increase the voltage of the highest voltage secondary output comprises:
   transferring energy from the primary to the highest voltage secondary output at a first switching rate.

3. The method of claim 2, wherein transferring energy from the primary to the highest voltage secondary output and the lowest voltage secondary output so as to concurrently increase the voltage of the highest voltage secondary output and the voltage of the lowest voltage secondary output further comprises:
   transferring energy from the primary to the highest voltage secondary output and the lowest voltage secondary output at a second switching rate.

4. The method of claim 3, wherein the second switching rate is greater than the first switching rate.

5. The method of claim 1, wherein transferring energy from the primary to the highest voltage secondary output so as to increase the voltage of the highest voltage secondary output comprises:
   transferring energy from the primary to the highest voltage secondary output so as to increase the voltage of the highest voltage secondary output to a first high voltage regulation value.

6. The method of claim 5, wherein the first high voltage regulation value is twenty percent of a final target value of the voltage of the highest voltage secondary output.

7. The method of claim 5, wherein transferring energy from the primary to the lowest voltage secondary output so as to concurrently increase the voltage of the lowest voltage secondary output while regulating the voltage of the highest voltage secondary output comprises:
   regulating the voltage of the highest voltage secondary output to the first high voltage regulation value.

8. The method of claim 1, wherein transferring energy from the primary to the highest voltage secondary output and the lowest voltage secondary output so as to concurrently increase the voltage of the highest voltage secondary output and the voltage of the lowest voltage secondary output further comprises:
   controlling the voltage of the highest voltage secondary output and the voltage of the lowest voltage secondary output relative to a common reference voltage.

9. The method of claim 8, further comprising:
   transferring energy from the primary to the highest voltage secondary output and the lowest voltage secondary output at a variable switching rate so as to concurrently increase the voltage of the highest voltage secondary output and the voltage of the lowest voltage secondary output by monotonically increasing the common reference voltage.

10. The method of claim 8, further comprising:
    providing the common reference voltage using a capacitor.

11. The method of claim 10, further comprising:
    regulating the voltage of the lowest voltage secondary output relative to a low voltage reference when the voltage of the lowest voltage secondary output reaches a final target value;
    using the capacitor to provide an integrated value of a sampled voltage; and
    regulating a load current of the highest voltage secondary output relative to the integrated value of the sampled voltage.

12. The method of claim 10, further comprising:
regulating the voltage of the lowest voltage secondary output relative to a low voltage reference when the voltage of the lowest voltage secondary output reaches a final target value; and
regulating the voltage of the highest voltage secondary output relative to a high voltage reference.

13. The method of claim 1, further comprising:
transferring energy from the primary to an intermediate voltage secondary output so as to concurrently increase a voltage of the intermediate voltage secondary output to a first intermediate voltage regulation value while regulating the voltage of the highest voltage secondary output, the voltage of the highest voltage secondary output greater than the voltage of the intermediate voltage secondary output, and the voltage of the intermediate voltage secondary output greater than the voltage of the lowest voltage secondary output.

14. The method of claim 13, wherein transferring energy from the primary to the highest voltage secondary output and the lowest voltage secondary output so as to concurrently increase the voltage of the highest voltage secondary output and the voltage of the lowest voltage secondary output further comprises:
transferring energy from the primary to the highest voltage secondary output, the intermediate voltage secondary output, and the lowest voltage secondary output so as to concurrently increase the voltage of the highest voltage secondary output, the voltage of intermediate voltage secondary output, and the voltage of the lowest voltage secondary output.

15. The method of claim 1, wherein the multi-output switch-mode converter system is configured as a multi-output flyback converter system.

16. A multi-output power converter configured to provide power to multiple loads, the multi-output power converter comprising:
a system control module;
a transformer comprising a primary coil and a stacked secondary coil having a plurality of stacked secondary outputs, the primary coil electrically coupled to receive energy from a first power supply; and
a secondary switches block electrically coupled to the plurality of stacked secondary outputs and comprising a plurality of outputs, the plurality of outputs comprising a highest voltage output and a lowest voltage output;
wherein during a start-up transient prior to reaching a steady state, the system control module is configured to control a transference of energy from the primary coil to the plurality of outputs such that during an initial soft-start phase, a voltage of the highest voltage output increases monotonically before a voltage of the lowest voltage output increases, and during a subsequent ramping phase, the voltage of the highest voltage output rises concurrently with the voltage of the lowest voltage output.

17. The multi-output power converter of claim 16, further comprising:
a primary switch electrically coupled to the primary coil, wherein the system control module is configured to provide control signals to the primary switch and to the secondary switches block to control the transference of energy from the primary coil to the plurality of outputs; and
wherein during the subsequent ramping phase, the system control module is configured to provide control signals to regulate the voltage of the highest voltage output and the voltage of the lowest voltage output relative to a common reference voltage.

18. The multi-output power converter of claim 17, wherein a capacitor is configured to provide the common reference voltage.

19. The multi-output power converter of claim 18, wherein the capacitor is configured to receive a current so as to monotonically increase the common reference voltage during the subsequent ramping phase.

20. The multi-output power converter of claim 19, wherein in the steady state the capacitor is configured to provide an integrated value of a sampled voltage and the control signals control a current of the highest voltage output in relation to the integrated value.

21. The multi-output power converter of claim 17, wherein the control signals regulate the voltage of the highest voltage output relative to a high voltage reference in the steady state.

22. The multi-output power converter of claim 17, wherein the control signals regulate the voltage of the lowest voltage output relative to a low voltage reference in the steady state.

23. The multi-output power converter of claim 17, wherein the primary switch is configured to switch at a first frequency in the initial soft-start phase and to switch at a second frequency in the subsequent ramping phase.

24. The multi-output power converter of claim 23, wherein the second frequency is greater than the first frequency.

25. The multi-output power converter of claim 23, wherein the second frequency is varied so as to monotonically increase the common reference voltage during the subsequent ramping phase.

26. The multi-output power converter of claim 16, wherein the plurality of outputs further comprises an intermediate voltage output.

27. The multi-output power converter of claim 26, wherein during the initial soft-start phase, a voltage of the intermediate voltage output increases monotonically before a voltage of the lowest voltage output increases, and during the subsequent ramping phase, the voltage of the highest voltage output rises concurrently with the voltage of the intermediate voltage output and the voltage of the lowest voltage output.

28. The multi-output power converter of claim 26, wherein the voltage of the highest voltage output is greater than the voltage of the intermediate voltage output, and wherein the voltage of the intermediate voltage output is greater than the voltage of the lowest voltage output.

29. The multi-output power converter of claim 28, wherein the multiple loads comprise:
a light emitting diode (LED) string configured to receive power from the highest voltage output; and
an audio amplifier configured to receive power from the intermediate voltage output.

30. The multi-output power converter of claim 29, wherein the system control module is configured to receive power from at least one of the highest voltage output, the intermediate voltage output, and the lowest voltage output.

31. The multi-output power converter of claim 16, wherein the multi-output power converter is configured as a multi-output flyback converter.

32. A method of sequencing a plurality of output voltages from an off-state to an operational steady-state in a multi-output power converter system, wherein the plurality of output voltages comprise a lowest voltage output and a highest voltage output, the method comprising:
- providing a power source to a primary of the multi-output power converter system;
- starting the multi-output power converter system in a soft-start mode, wherein starting the multi-output system converter system in the soft-start mode comprises:
  - increasing a voltage of the highest voltage output in the soft-start mode;
  - regulating the voltage of the highest voltage output in the soft-start mode;
  - increasing a voltage of the lowest voltage output in the soft-start mode; and
- controlling the plurality of output voltages in a ramping mode, wherein controlling the plurality of output voltages in the ramping mode comprises:
  - concurrently increasing the voltage of the lowest voltage output with the voltage of the highest voltage output.

33. The method of claim 32, wherein regulating the voltage of the highest voltage output in the soft-start mode comprises:
- regulating the voltage of the highest voltage output to a first high voltage regulation value.

34. The method of claim 32, wherein the first high voltage regulation value is twenty percent of a final target value of the voltage of the highest voltage output.

35. The method of claim 32, wherein the voltage of the highest voltage output is greater than the voltage of the lowest voltage output.

36. The method of claim 32, wherein concurrently increasing the voltage of the lowest voltage output with the voltage of the high voltage output comprises:
- controlling the voltage of the highest voltage output and the voltage of the lowest voltage output relative to a common reference voltage.

37. The method of claim 36, wherein the common reference voltage is a capacitor voltage, and the capacitor voltage increases monotonically.

38. The method of claim 36, further comprising:
- regulating a current of the highest voltage output relative to the common reference voltage during the operational steady state.

39. The method of claim 36, further comprising:
- regulating the voltage of the highest voltage output relative to a high voltage reference during the operational steady state.

40. The method of claim 36, further comprising:
- regulating the voltage of the lowest voltage output relative to a low voltage reference during the operational steady state.

* * * * *